(12) United States Patent
Pedrizetti et al.

(10) Patent No.: US 6,609,182 B1
(45) Date of Patent: Aug. 19, 2003

(54) SMART HIBERNATION ON AN OPERATING SYSTEM WITH PAGE TRANSLATION

(75) Inventors: Raymond D. Pedrizetti, Issaquah, WA (US); Pierre-Yves Santerre, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/488,271

(22) Filed: Jan. 20, 2000

(51) Int. Cl.$^7$ ................................................ G06F 12/00
(52) U.S. Cl. ..................... 711/159; 711/133; 711/162; 711/165; 713/1; 713/300; 713/323
(58) Field of Search ................................ 711/159, 133, 711/162, 165; 713/300, 323

(56) References Cited

U.S. PATENT DOCUMENTS

| | | | | |
|---|---|---|---|---|
| 5,778,443 A | * | 7/1998 | Swanberg et al. | 711/162 |
| 5,784,628 A | * | 7/1998 | Reneris | 395/750.01 |
| 5,809,329 A | * | 9/1998 | Lichtman et al. | 710/8 |
| 6,209,088 B1 | * | 3/2001 | Reneris | 713/1 |

FOREIGN PATENT DOCUMENTS

| | | | | |
|---|---|---|---|---|
| EP | 0636980 A1 | * | 1/1995 | G06F/11/14 |
| EP | 0636983 A1 | * | 1/1995 | G06F/11/14 |

OTHER PUBLICATIONS

IBM Technical Disclosure Bulletin, vol. 39, No. 1, "Ensure Page Table Consistency across Power Management Hibernation,"pp 415–416, Jan. 1996.*

IBM Technical Disclosure Bulletin, vol. 38, No. 5, "Operating System and Machine Independent Hibernation," pp 143–144, May 1995.*

IBM Technical Disclosure Bulletin, vol. 39, No. 6, "Method to Set a Hibernation Flag in a Hard Disk," pp 111–112, Jun. 1996.*

Babaoglu, O., et al., "Converting a Swap–Based System to do Paging in an Architecture Lacking Page–Referenced Bits", *Computer Science Division, Department of Electrical Engineering and Computer Sciences*, ACM 0–089791–062–1–12/81–0078, 78–86, (1981).

Denning, P.J., "Working Sets Past and Present", *IEEE Transactions on Software Engineering*, vol. SE–6, No. 1 (ISSN 0098–5589), 65–84, (Jan. 1980).

Kenah, L.J., et al., "VAX/VMS Internals and Data Structures", *Digital Press*, Version 4.4, 386–387.

* cited by examiner

Primary Examiner—Matthew Kim
Assistant Examiner—Stephen Elmore
(74) Attorney, Agent, or Firm—Workman, Nydegger & Seeley

(57) ABSTRACT

A duplicate memory image of the pages that need to be saved (i.e. hibernated) is created within volatile memory. The pages to be hibernated include all pages whose state is locked and a portion, if not all, of the pages whose state is idle. If the duplicate memory image of the pages to be hibernated cannot, however, be created due to a lack of volatile memory, a portion of the idle pages is pushed out to the swap file on secondary storage to free more volatile memory for this duplication. This duplicate memory image of the pages to be hibernated along with a corresponding page table identifying their location within volatile memory are then written out to a file on the secondary storage, completing hibernation and allowing the computer system to shut down in a hibernate mode.

79 Claims, 20 Drawing Sheets

SMART HIBERNATION ON AN OPERATING SYSTEM WITH PAGE TRANSLATION

FIELD OF THE INVENTION

This invention relates generally to operating systems, and more particularly to smart hibernation on operating systems with page translation.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1998, Microsoft Corporation, All Rights Reserved.

BACKGROUND OF THE INVENTION

In general, a computer must traverse through a lengthy initialization process known as booting to load and launch its operating system. This operating system is typically stored on some type of non-volatile secondary storage media (e.g., a magnetic hard disk). A computer's processor, however, executes instructions from a volatile addressable memory (e.g., Dynamic Random Access Memory (DRAM)). This addressable memory generally must be initialized by a non-volatile memory residing in an EPROM (electronically programmable read-only memory). The initialization (i.e., boot-up) provides for the loading of a portion of the operating system from the hard disk into the volatile memory. Subsequently, using this portion of the operating system, the remaining loading and initialization of the operating system is completed.

Generally after each initialization, the computer comes up in a default state, regardless of a computer user's prior activities. This forces the computer user to restart any applications and to reload files he/she is going to use. Additionally, prior to the computer user turning off the computer, in general, all files should be saved and all applications closed. Consequently, to return to work within different applications and on particular files, the computer user must turn on the computer, wait for its initialization to be completed and reload the applications and files. For example, if the computer user was editing a spreadsheet, once the computer completed its initialization process, the computer user must restart the spreadsheet application, reload the particular spreadsheet for editing and relocate the portion of the particular spreadsheet being edited.

Some computers have been designed to solve these problems through what is termed hibernation. Hibernation, generally, is defined as the turning off of a computer in such a way that the state of the computer is "frozen" or "paused" (i.e., taking a snapshot of the current state of the computer prior to shutting the computer down). The computer user need not save files nor close applications prior to shutting down the computer, and upon powering on the computer at some later time, the computer user is able to return to the exact state of the computer prior to hibernation of the computer (i.e., the snapshot of the prior state of the computer is restored).

For example, returning to the previously described spreadsheet example, the computer user could be editing the particular spreadsheet and decide at some point to stop and power down the computer. Instead of going through the formal shut down process (i.e., saving the particular spreadsheet, closing the spreadsheet application and powering down the computer), the computer user could choose to place the computer in a hibernation mode. Upon powering on the computer at some later point in time, the spreadsheet application would be open with that particular spreadsheet being edited at the same location as when the computer user decide to place the computer in hibernation mode.

Hibernation, in general, saves the state of a computer that is normally lost during a general power-down of the computer to a secondary non-volatile storage (e.g., the computer's hard drive). The state being saved includes, but is not limited to, the state of volatile memory and the execution context of the processor along with the state of peripheral devices and their associated drivers. Through hibernation, without rebooting of the computer's operating system and upon restoration of power to the computer, the saved state is restored allowing for the resumption of program execution at a point at which hibernation was invoked.

In general, a computer having an operating system with page translation has a volatile memory that is comprised of three different categories of pages: locked, idle and free. A locked page is a page that must always reside within a volatile memory (i.e., cannot be pushed out to a swap page or file on a secondary storage) due to the nature of the information contained therein. Examples include those portions of code that directly interact with certain hardware on the computer that requires the actual physical address of the page within volatile memory containing the code (e.g., a device driver for specific hardware within the computer). An idle page is defined as a page within a volatile memory that contains code from an application that has recently been executed. Code in idle pages is subject to being pushed out to the swap file to free up pages in volatile memory for other code applications that will be executed by the computer's processor. Finally, a free page is a page within a volatile memory that currently is available and could be used later to hold code that may be executed by the computer's processor.

Currently, two types of hibernation are in use in the computing industry. The first version of hibernation is illustrated in FIG. 1. FIG. 1 illustrates a secondary storage 102, having a special partition 104 and a volatile memory 106. In this type of hibernation, special partition 104 is a reserved portion of secondary storage 102, dedicated to the exclusive use of storing all locked, idle and free pages that make up volatile memory 106 during hibernation. Once the computer initiates hibernation, special code within the BIOS of the computer is executed to provide for a complete copy of all data in volatile memory 106 to special partition 104. This hibernation technique, however, requires knowledge of the hardware on the computer (i.e., the amount of volatile memory). Additionally, this technique unnecessarily saves the free pages in volatile memory.

Similarly, the second type of hibernation is illustrated in FIG. 2. FIG. 2 illustrates a secondary storage 202 having a contiguous portion 204 and a volatile memory 206 containing locked pages 208. This type of hibernation does not dedicate a specific portion of secondary storage 202, as does the first type. Rather, once the hibernation process commences, the operating system determines the size of volatile memory 206 and dynamically allocates the contiguous portion 204 on secondary storage 202 for hibernation. Subsequently, locked pages 208 are copied from volatile memory 206 to contiguous portion 204 of secondary storage 202, thereby completing the hibernation process. Because the code performing the hibernation is contained within locked pages 208 of volatile memory 206, this code is also written out to contiguous portion 204 during the hibernation process. Moreover, this type of hibernation is unable to use the regular file system code to write the locked memory out to disk because a disk access, in general, modifies the memory being written to disk. There is a need in the art for a computing system with a more efficient hibernation that saves only those pages having data with the computing system's memory.

SUMMARY OF THE INVENTION

The above-mentioned shortcomings, disadvantages and problems are addressed by the present invention, which will be understood by reading and studying the following specification. A hibernation process creates a duplicate memory image of the pages that need to be saved (i.e. hibernated) within volatile memory. The pages to be hibernated include all pages whose state is locked and a portion, if not all, of the pages whose state is idle. If the duplicate memory image of the pages to be hibernated cannot, however, be created due to a lack of volatile memory, some or all of the idle pages are pushed out to a swap file on secondary storage to free more volatile memory for this duplication. The duplicate memory image of the pages to be hibernated, along with a corresponding page table identifying their location within volatile memory, are written out to a file on the secondary storage, completing the hibernation process and allowing the computer system to shut down in a hibernation mode. Subsequently, when the computer system is powered on, the volatile memory within the computer system is restored back to a state just prior to the invocation of hibernation. Restoration of the volatile memory is achieved by placing the pages of the duplicate memory image from the file on the secondary storage in to their original location in volatile memory based on the corresponding page table.

This hibernation process balances between saving of information directly from the volatile memory versus saving of information from the swap file located on a secondary storage of the computer system. Additionally, this hibernation process allows the use of regular disk services available during the normal operating environment. The present invention provide the advantages stated above, as well as other advantages which will become apparent to those skilled in the art upon reading and understanding the present specification. The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, particular implementations of the invention are described. Finally, in the fifth section, a conclusion of the detailed description is provided.

Hardware and Operating Environment

Figure 1:
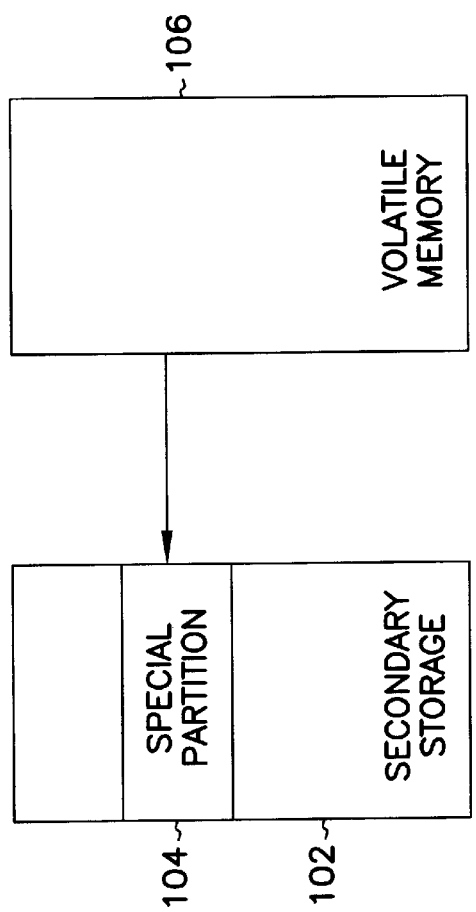
FIG. 1 is a diagram of a prior art hardware and operating environment.
Figure 2:
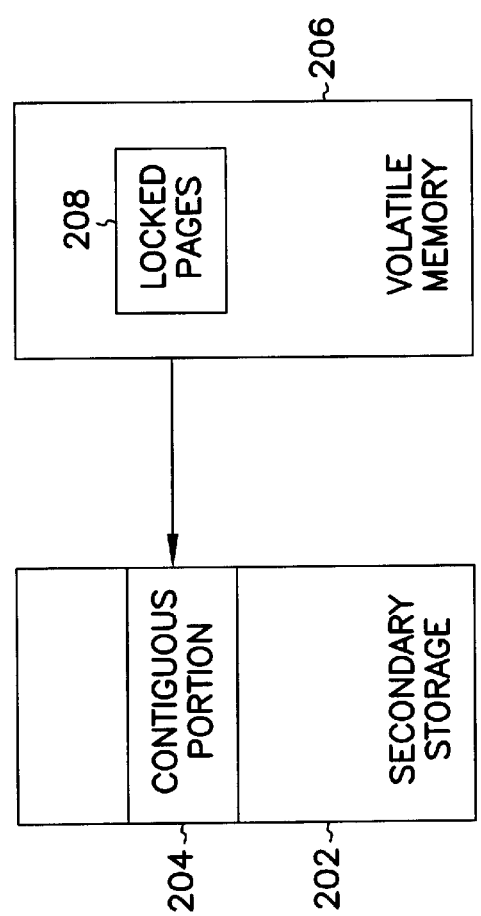
FIG. 2 is a diagram of another prior art hardware and operating environment.
Figure 3:
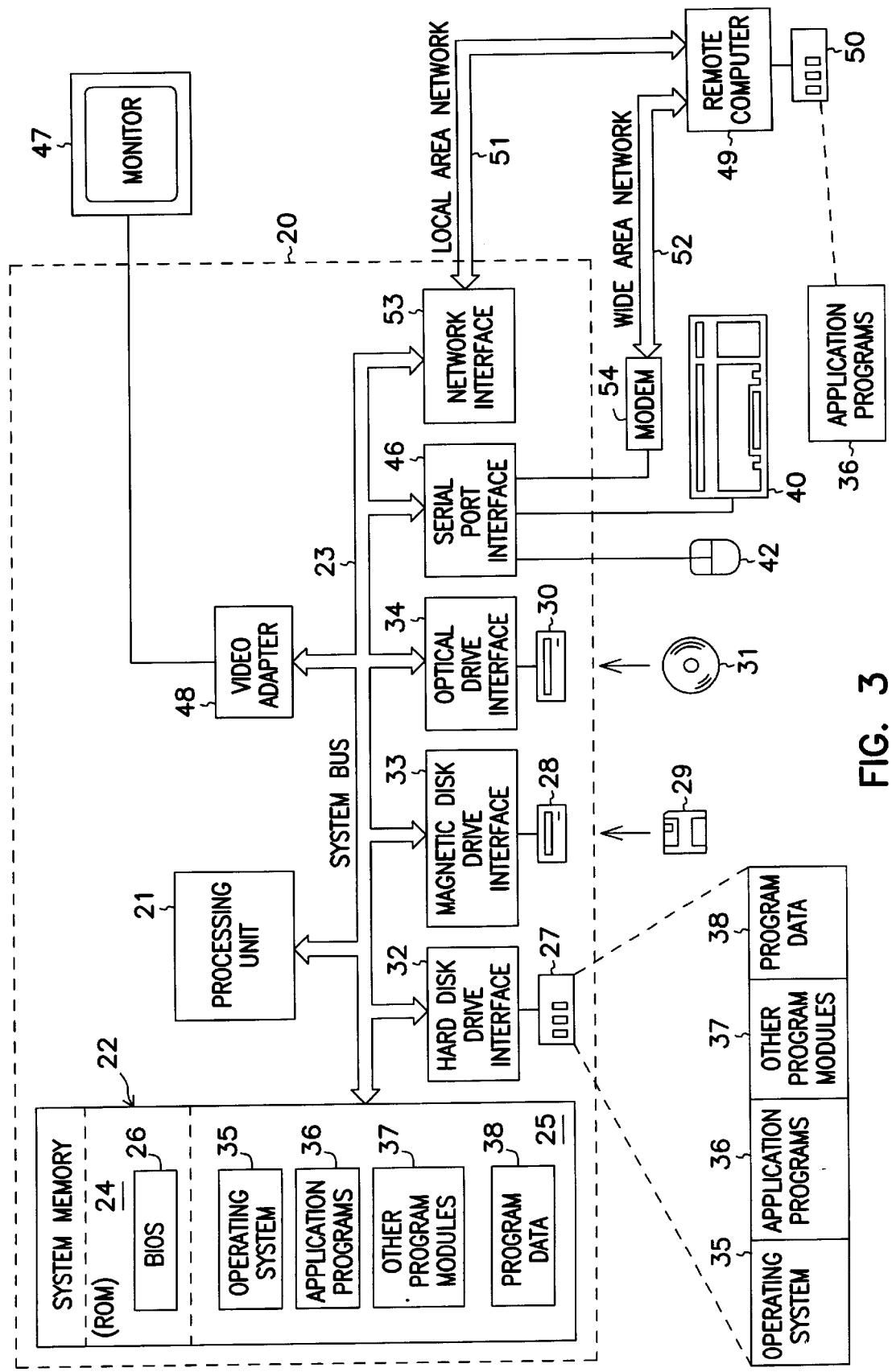
FIG. 3 is a diagram of an exemplary hardware and operating environment in conjunction with which embodiments of the invention may be practiced.

FIG. 3 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 3 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, BERNOULLI® memory cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 3, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 3. The logical connections depicted in FIG. 3 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising MICROSOFT® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and JAVA® programming language are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

System Level Overview

Figure 4:
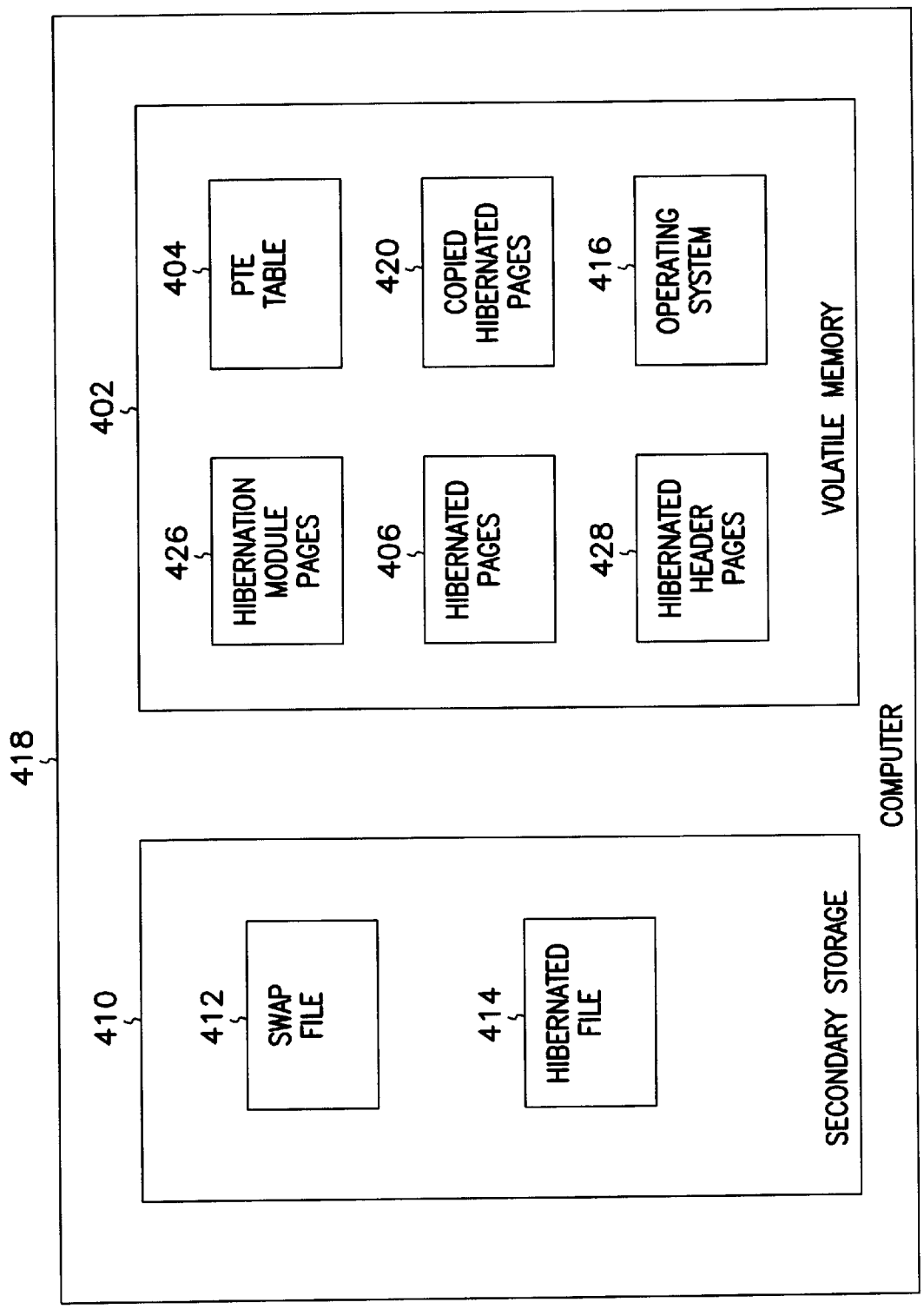
FIG. 4 is a diagram illustrating a system-level overview of an exemplary embodiment of the invention.

A system level overview of the operation of an exemplary embodiment of a smart hibernation process is described by reference to FIG. 4. Computer 418 of FIG. 4 is one embodiment of computer 20 of FIG. 3. Computer 418 includes volatile memory 402, which is one embodiment of random access memory (RAM) 25 of FIG. 3, such that volatile memory 402 loses the data it contains once power is turned off. Volatile memory 402 contains operating system 416, PTE (page table entry) table 404, hibernated pages 406, copied hibernated pages 420, hibernation module pages 426 and hibernated header pages 428. Operating system 416, PTE table 404, hibernated pages 406, copied hibernated pages 420, hibernation module pages 426 and hibernated header pages 428 include one to a number of pages within volatile memory 402. Additionally, computer 418 includes secondary storage 410, which is one embodiment of hard disk drive 27 of FIG. 3. Secondary storage 410 contains swap file 412 and hibernated file 414.

Those of ordinary skill within the art will appreciate that computer 418 may also include other components, not shown in FIG. 4; only those parts necessary to describe the invention in an enabling manner are provided. Moreover, it is important to appreciate that the pages and tables contained in volatile memory 402 (including operating system 416, PTE table 404, hibernated pages 406, copied hibernated pages 420, hibernation module pages 426 and hibernated header pages 428 ) are not required to be contiguous, and, in general, these structures in volatile memory 402 are non-contiguous.

A computer user of computer 418 typically invokes the smart hibernation process at a point when computer 418 is running in normal operation. The invocation can occur in a variety of ways including, but not limited to, a user command, a predefined time period without user activity or, a mechanical event such as a battery at low-power state or the shutting of a lid on a laptop computer. Upon invocation of the smart hibernation process, operating system 416 locks a smart hibernation module, which contains the code to perform the smart hibernation (i.e., the smart hibernation process), into hibernated module pages 426 within volatile memory 402. In accordance with one embodiment of the present invention, the smart hibernation process is generically implemented, thereby allowing this functionality on different computers having different software and hardware configurations.

The smart hibernation process locks a number of free pages within volatile memory 402, forming PTE table 404. In an exemplary embodiment, PTE table 404 is a page table, which is a table containing page table entries (PTEs), one entry per each physical address for pages within volatile memory 402 of computer 418. It is important, however, to appreciate that the data structure of PTE table 404 is not limited to a page table but may be any type of data structure having the requisite space to hold the PTEs. These PTEs are needed during the restoration portion of the smart hibernation process to allow hibernated pages 406 to be placed in their original locations within volatile memory 402.

Additionally, the smart hibernation process locks a number of free pages within volatile memory 402, forming copied hibernated pages 420. However, if the number of free pages in volatile memory is not sufficient to make a duplicate image of hibernated pages 406, the smart hibernation process pushes a number of the idle pages out to swap file 412. In an exemplary embodiment, hibernated pages 406 include the locked and idle pages of volatile memory 402. In another embodiment, swap file 412 is a hidden file residing on secondary storage 410 and used by operating system 416 for swapping or paging, as is well known in the art.

After reserving the requisite number of free pages within volatile memory 402 for both PTE table 404 and copied hibernated pages 420, the smart hibernation process places the PTE for each hibernated page of volatile memory 402 into PTE table 404 and duplicates hibernated pages 406 into copied hibernated pages 420. PTE table 404 and copied hibernated pages 420 are saved to hibernated file 414 on secondary storage 410, thereby completing the smart hibernation process and allowing computer 418 to power down.

Later, when computer 418 is powered on, the smart hibernation process is invoked to restore volatile memory 402, back to the state it was in just prior to the invocation of the smart hibernation process. The smart hibernation process provides for the restoration of volatile memory 402 by placing copied hibernated pages 420 from hibernated file 414 into their original location in volatile memory 402 based on the PTEs from PTE table 404.

Figure 5:
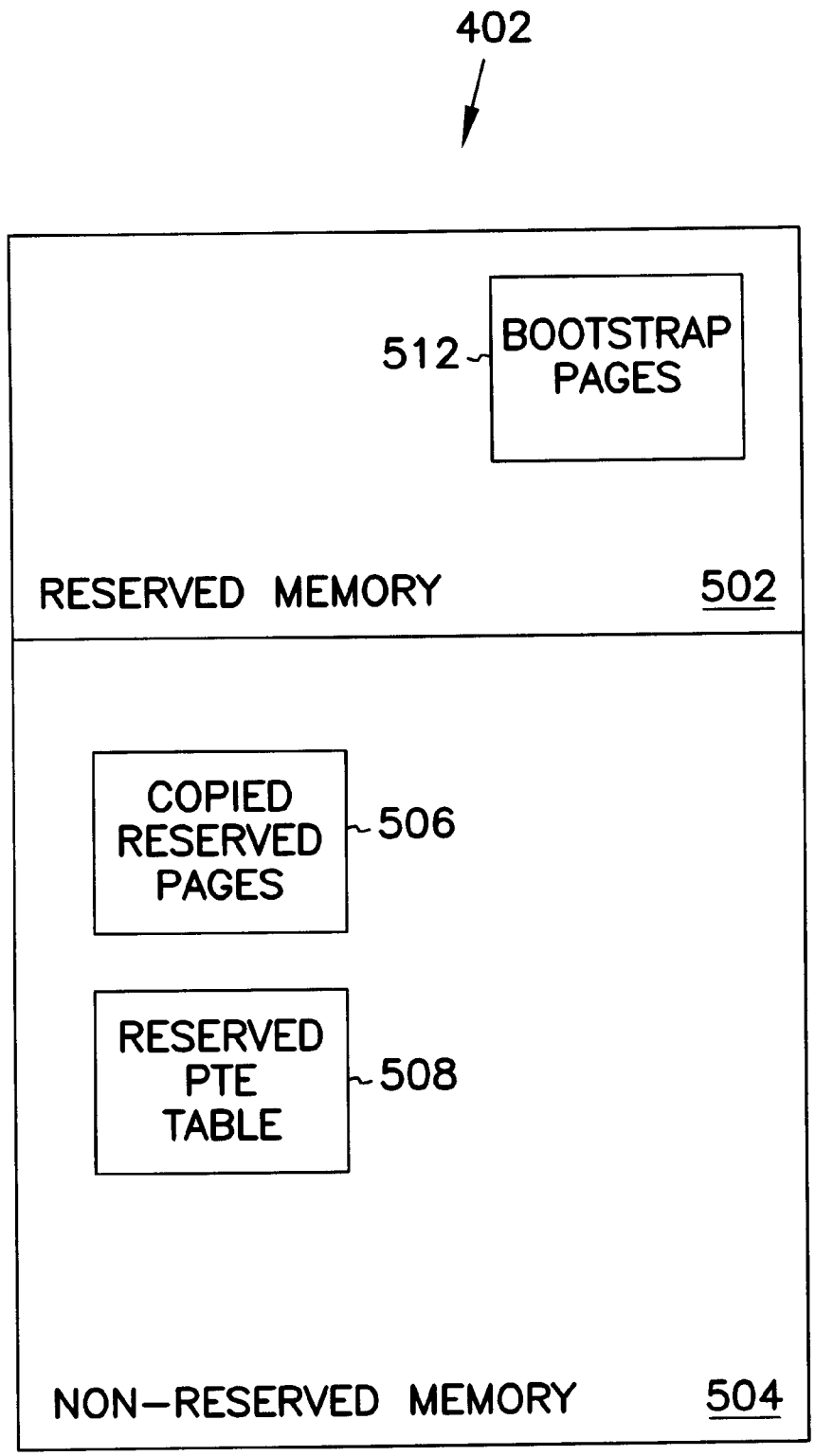
FIG. 5 is a diagram illustrating a volatile memory having reserved portions in conjunction with which embodiment of the invention may be practiced.

In accordance with another embodiment of the invention, the above-described smart hibernation process is modified to accommodate computer systems that have portions of their volatile memory reserved for special purposes. FIG. 5 illustrates an exemplary embodiment of volatile memory 402 of FIG. 4 having reserved portions. In particular, FIG. 5 includes reserved memory 502 and non-reserved memory 504 within volatile memory 402. Reserved memory 502 is a section of volatile memory 402 reserved generally for use by the computer's operating system to initialize the computer. In one embodiment, the non-reserved section of volatile memory is that portion of volatile memory 402 used to hold portions of applications and data which have recently been used by the processing unit of the computer. Additionally, all of the pages of volatile memory 402 described in conjunction with FIG. 4 (i.e., operating system 416, PTE table 404, hibernated pages 406, copied hibernated pages 420, hibernation module pages 426 and hibernated header pages 428 ) are not shown but are included in non-reserved memory 504.

During the initialization of the computer, none of the pages in reserved memory 502 can be locked, as these pages must be free to initialize the operating system. Therefore in general, the smart hibernation process reserves (i.e., locks) enough pages in non-reserved memory 504 to subsequently copy all of the pages of reserved memory 502 prior to beginning the above-described process of FIG. 4. This ensures that the smart hibernation process also saves the data within pages of reserved memory 502 to hibernation file 414, which is retained for the subsequent restoration. Therefore, because the hibernated pages within reserved memory 502 have been copied into non-reserved memory 504, only hibernated pages located within non-reserved memory 504 need to be duplicated and saved to hibernated file 418.

Thus, a number of free pages are reserved within non-reserved memory 504 sufficient to hold the pages of reserved memory 502, forming copied reserved pages 506. Similarly, a number of free pages are reserved within non-reserved memory 504 sufficient to hold a PTE for each page within reserved memory 502, forming reserved PTE table 508. Subsequently, the PTE for each page in reserved memory 502 is placed in reserved PTE table 508 and the pages in reserved memory 502 are copied into copied reserved pages 506. During the restoration after computer 418 is powered up and copied hibernated pages 420, which includes copied reserved pages 506 and reserved PTE table 508, are returned from hibernation file 414 to their original location in volatile memory 402, the locked pages of copied reserved pages 506 are copied back to their original location within reserved memory 502 from non-reserved memory 504 based on the PTEs within reserved PTE table 508.

The system level overview of the operation of an exemplary embodiment of the invention has been described in this section of the detailed description. The smart hibernation process creates a duplicate image in volatile memory of the hibernated pages therein. If the duplicate memory image of the hibernated pages cannot be created due to a lack of free pages in volatile memory, some or all of the idle pages are pushed out to a swap file on secondary storage. The duplicate memory image is then written out to a file on secondary storage, completing the smart hibernation process and allowing the computer system to shut down in a hibernation mode. Subsequently, when the computer system is powered on, the volatile memory within the computer system is restored back to the state it was in just prior to the invocation of hibernation. This restoration of the volatile memory is achieved by placing the pages of the duplicate memory image from the file on the secondary storage into their original location in volatile memory. While the invention is not limited to any particular computer or its operating system and volatile memory, for sake of clarity a simplified computer along with its operating system and volatile memory has been described.

Methods of an Exemplary Embodiments of the Invention

In the previous section, a system level overview of the operation of an exemplary embodiment of the invention was described. In this section, the particular methods performed by a computer of such an exemplary embodiment are described by reference to a series of flowcharts. The methods to be performed by the computer constitute computer programs made up of computer-executable instructions. Describing the methods by reference to a flowchart enables one skilled in the art to develop such programs including such instructions to carry out the methods on suitable computers (the processor of the computer executing the instructions from computer-readable media).

Hibernation of a Volatile Memory not Having Reserved Portions

Figure 6A:
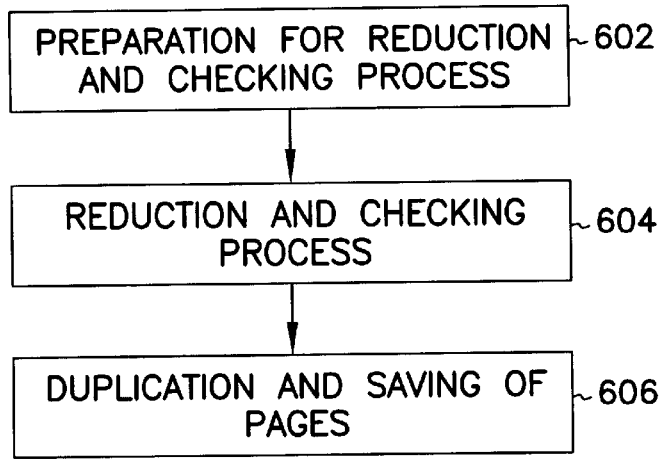
FIGS. 6A–6E are flowcharts of a method of hibernation for a computer having a volatile memory with no reserved portions according to an embodiment of the invention.
Figure 6B:
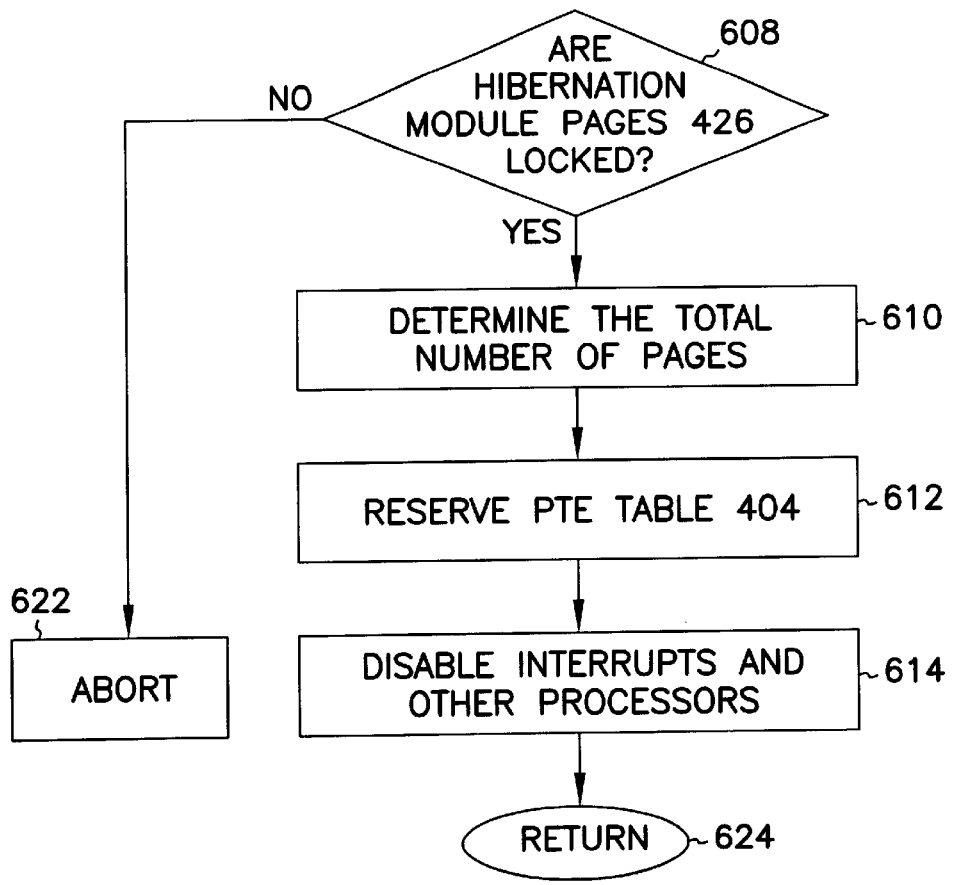
Figure 6C:
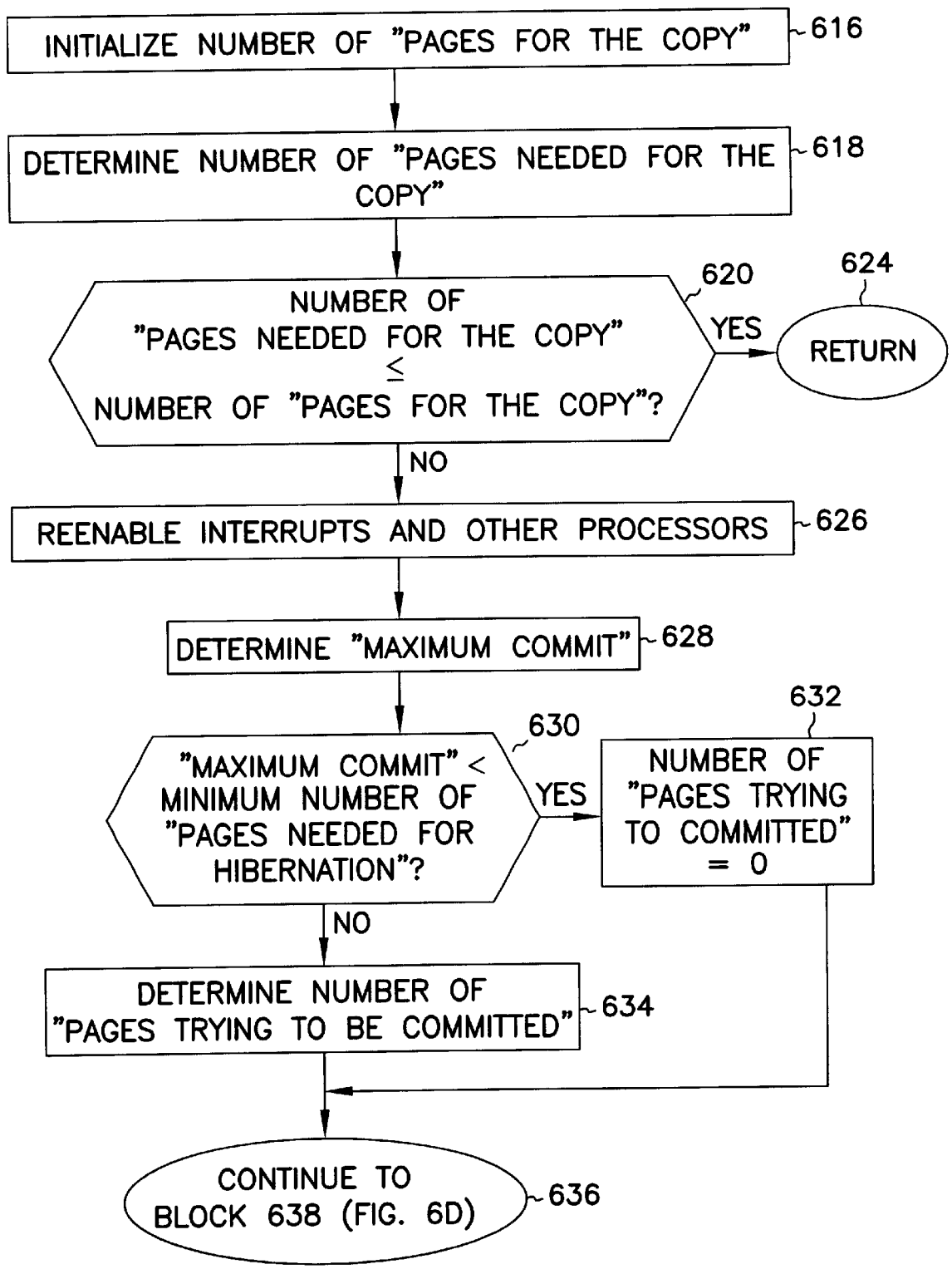
Figure 6D:
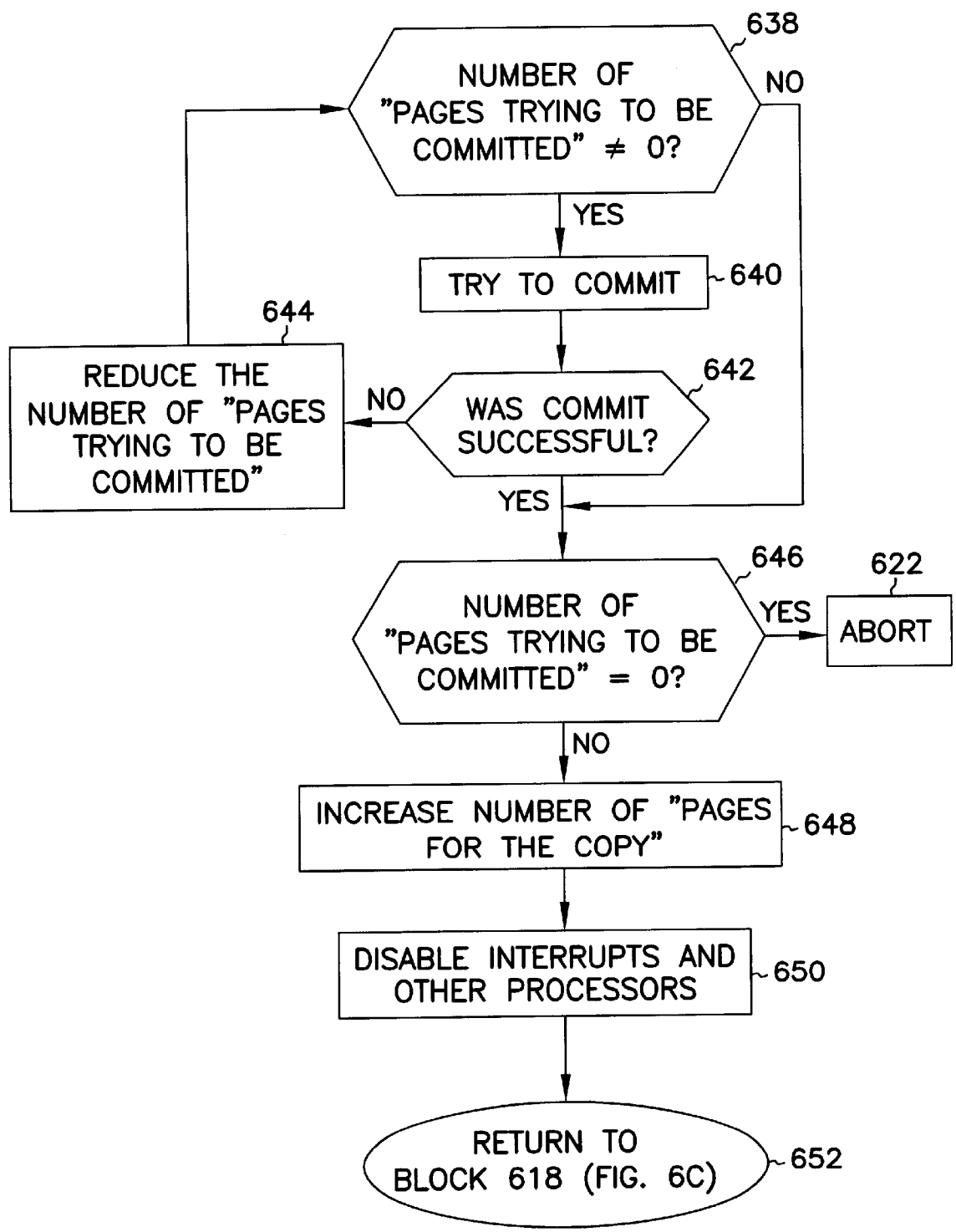
Figure 6E:
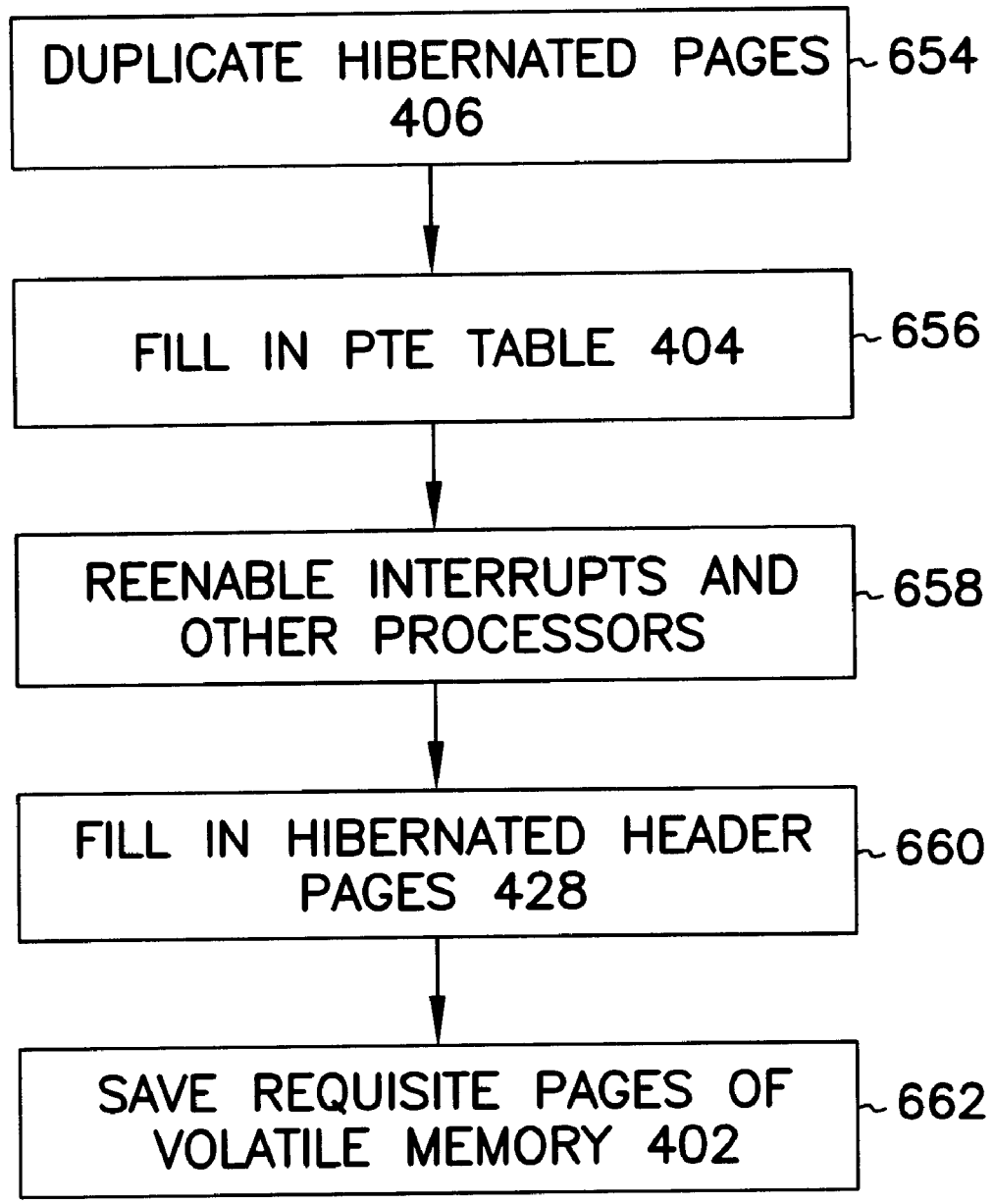

Referring first to FIG. 6A, a flowchart of a method to be performed by a computer according to an embodiment of the invention is shown and explained.with reference to computer 418 along with its components illustrated in FIG. 4. The method begins with the invocation of the smart hibernation process. A computer user of computer 418, in general, invokes the smart hibernation process at a point when computer 418 is running in normal operation. Upon invocation, the smart hibernation process prepares for the subsequent reduction and checking process (block 602), which is illustrated in FIG. 6B and described below. Additionally, the smart hibernation process executes a reduction and checking process (block 604), which is illustrated in FIGS. 6C and 6D and described below. Finally, the smart hibernation process completes by duplicating and saving particular pages of volatile memory 402 (block 606), which is illustrated in FIG. 6E and described below. Computer 418 is then powered down.

FIG. 6B illustrates the preparation for the subsequent reduction and checking process according to an embodiment of the invention. Instructions for the smart hibernation process are dynamically locked (block 608) into one or more pages of volatile memory 402 (i.e., hibernation module pages 426). If operating system 416 is unable to lock hibernation module pages 426, operating system 416 aborts the smart hibernation process and returns an error (block 622). Once operating system 416 locks the smart hibernation module into hibernation module pages 426 within volatile memory 402, the smart hibernation process determines the total number of pages of volatile memory 402 (block 610).

A number of free pages within volatile memory 402 are reserved within volatile memory 402 sufficient to hold a page table entry (PTE) for each page within volatile memory 402, forming PTE table 404 (block 612). In an exemplary embodiment, the smart hibernation process will typically only save about one-half of volatile memory 402, and would therefore not require a PTE for every page in volatile memory 402. In one embodiment, because the ratio of the amount of bytes for PTE to a page is small, generally 1/1000 (i.e., 4 bytes/4 kilobytes (Kbytes)), the smart hibernation process reserves a PTE for every page in volatile memory 402. Advantageously, saving a PTE for every page in volatile memory 402 simplifies the implementation of the smart hibernation process without occupying any significant amount of storage. It is important, however, to appreciate that the invention is not so limited as to require the saving a PTE for every page in volatile memory 402. The smart hibernation process disables interrupts and other processors to place computer 418 into a steady-state (block 614).

FIGS. 6C and 6D illustrate the reduction and checking process according to an exemplary embodiment of the invention. The reduction and checking process attempts to reserve the requisite number of pages in volatile memory 402 to make a duplicate image of the pages to be copied to secondary storage 410. Referring to FIG. 6C, the reduction and checking process initializes the number of "pages in memory reserved for the copy" (i.e., "copy reserved") to zero (block 616). These number of pages are those pages that has currently been locked by the reduction and checking process to subsequently be used to make a copy of all of the pages that subsequently need to be saved to hibernated file 414 on secondary storage 410. Additionally, the number of "pages in memory needed for the copy" (i.e., "copy needed") is then determined (block 618). In an exemplary embodiment, this number is calculated based on the following equation:

$$\text{Copy needed} = \text{number of hibernated header pages} + \quad \text{(Equation 1)}$$
$$\text{number of PTE table pages} +$$
$$\text{number of idle pages} +$$
$$\text{number of locked pages}$$

These are the number of pages that need to be available in volatile memory 402 in order to make a duplicate (i.e. copy) of all of the pages that subsequently need to be saved to hibernated file 414 on secondary storage 410. Subsequently, the number of "pages in memory reserved for the copy" are compared to the number of "pages in memory needed for the copy" (block 620). If the number of "pages in memory needed for the copy" are less than or equal to the number of "pages in memory reserved for the copy," the reduction and checking process has reserved a sufficient number of pages in memory to perform the duplication and saving of pages to secondary storage 410. Therefore, the reduction and checking process completes and returns (block 624) to block 606 of FIG. 6A.

Conversely, upon determining that the number of "pages in memory needed for the copy" are greater than the number of "pages in memory reserved for the copy," the reduction and checking process continues. The process then reenables the interrupts and other processors (block 626). The maximum number of "pages that can be committed in memory" (i.e., "maximum commit") is then determined (block 628).

In an exemplary embodiment, this number is calculated based on the following equation:

$$\text{Maximum commit} = \text{maximum locked} - \text{number of locked pages} \quad \text{(Equation 2)}$$

"Maximum locked" equals the maximum number of "pages that can possibly be locked in memory." This value is typically less than the total number of pages in memory because a certain minimum number of pages must remain available for operational purposes. In one embodiment, in a computer having 16 Mbytes of memory (i.e., 4000 total pages in memory), this minimum number of pages equals four. This minimum number, however, varies depending on the type of computer and operating system on which the smart hibernation process is being executed.

Subsequently, the maximum number of "pages that can be committed in memory" is compared to the minimum number of "pages needed for hibernation" (i.e., the number of pages in volatile memory 402 that must be free to perform the copy and save to secondary storage 410) (block 630). If the maximum number of "pages that can be committed in memory" is less than this minimum number, the reduction and checking process sets the number of "pages trying to be committed" to zero (block 632). In turn, this subsequently forces the operating system to abort the smart hibernation process (block 622). The smart hibernation process is aborted, under these circumstances, because the process will be unable to perform the duplication and saving of the pages due to the lack of the minimum number of pages to perform these operations.

Conversely, upon determining that the maximum number of "pages that can be committed in memory" is greater than or equal to the minimum number of "pages needed for hibernation," (i.e., "minimum hibernation") the reduction and checking process continues. The process then determines the number of "pages trying to be committed" (i.e., "commit try") (block 634). In an exemplary embodiment, this number is calculated based on the minimum of the two values calculated based on the following two equations:

$$\text{Commit try} = \text{copy needed} - \text{copy reserved}; \quad \text{(Equation 3)}$$

OR $$\text{Commit try} = \text{maximum commit} - \text{minimum hibernation} \quad \text{(Equation 4)}$$

Once the reduction and checking process calculates the number of "pages trying to be committed," the process continues (block 636) and enters an inner loop that attempts to commit the requisite number of pages for the copy process.

In particular referring to FIG. 6D, the reduction and checking process checks whether the number of "pages trying to be committed" does not equal zero (block 638). Upon determining that this number does equal zero, the reduction and checking process aborts the smart hibernation process, as there are an insufficient number of pages available in volatile memory 402 to reserve for the duplication of the requisite pages for hibernation (block 622). Conversely, upon determining that this number does not equal zero, the reduction and checking process attempts to commit (i.e., reserve) a number of pages in volatile memory 402 (i.e., the number of "pages trying to be committed") (block 640). The reduction and checking process then determines if this commit was successful (block 642).

Upon determining that the commit (i.e., the reservation) was not successful, the reduction and checking process reduces the number of "pages trying to be committed" (block 644). In an exemplary embodiment, the reduction and checking process reduces the number of "pages trying to be committed" by one-half. The reduction and checking process reduces these number of pages by converting a number of idle pages to free pages by pushing (i.e., moving) the requisite number of idle pages out to swap file 412 on secondary storage 410, thus freeing up more pages for the copy process.

Subsequent to reducing the number of "pages trying to be committed," the reduction and checking process returns to block 636 to ensure that this number does not equal zero. If this number does equal zero, the operating system aborts the entire smart hibernation process as there are an insufficient number of pages available in memory to reserve for the duplication of the requisite number of pages for hibernation (block 622). Conversely, if this number does not equal zero, the reduction and checking process continues attempting to commit those number of pages in volatile memory 402 and reducing this number until (1) a commitment was successful, or (2) the number of "pages trying to be committed" equals zero.

Whether the commitment was successful or the number of "pages trying to be committed" equals zero, the reduction and checking process again checks whether the number of "pages trying to be committed" equals zero (block 646). If this value does equal zero, the operating system aborts the smart hibernation process (block 622). Conversely, if the number of "pages trying to be committed" does not equal zero, the number of "pages in memory reserved for the copy" is re-determined (block 648). In an exemplary embodiment, this number is based on the following equation:

$$\text{Copy reserved} = \text{copy reserved} + \text{commit try} \quad \text{(Equation 5)}$$

Subsequently, the reduction and checking process disables the interrupts and other processors (block 650) and returns to block 618 (in FIG. 6C) to reset the number of "pages in memory needed for the copy" (block 652). Therefore, the reduction and checking process completes under one of two conditions: (1) the reduction and checking process successfully committed (i.e., reserved) a sufficient number of pages for the copy process and the smart hibernation process continues (block 624) or (2) the reduction and checking process was not successful in making the commitment of the requisite pages and the operating system aborts the smart hibernation process completely (block 622).

FIG. 6E illustrates the duplication and saving of the requisite number of pages according to an exemplary embodiment of the invention. Volatile memory 402 is traversed to locate and duplicate each remaining hibernated page (i.e., each locked page and idle page) into copied hibernated pages 420 of volatile memory 402 (block 654). Additionally, the smart hibernation process copies the address for each of these hibernated pages into PTE table 404 (block 656). Once this traversal of volatile memory 402 is complete, the interrupts and other processors are reenabled (block 658). The smart hibernation process creates and places the header into hibernated header pages 428 (block 660).

Figure 13:
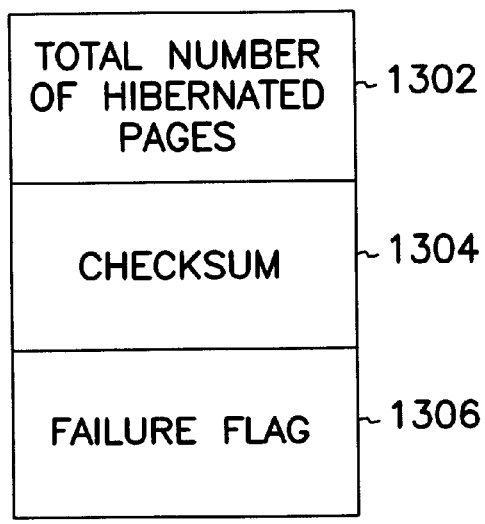
FIG. 13 is a diagram illustrating a data structure for a header for a volatile memory with no reserved portions according to an embodiment of the invention.

In an exemplary embodiment illustrated in FIG. 13, the header placed into hibernated header pages 428 contains various accounting data for the smart hibernation process, including, but not limited to, (1) the number of hibernated pages saved in hibernated file 414 (block 1302), (2) a checksum to be used in the restoration process to ensure that the data written out to hibernated file 414 has not been corrupted (block 1304) and (3) a failure flag (block 1306). This failure flag, when turned on, notifies operating system 416 that there was a previous failed attempt at restoring volatile memory 402 after hibernation. Operating system 416 then provides the user with the option of either (1) attempting another restoration of volatile memory 402 or (2) bailing out and performing a complete initialization of computer 418, thereby losing the data in hibernated file 414 for volatile memory 402.

Figure 15:
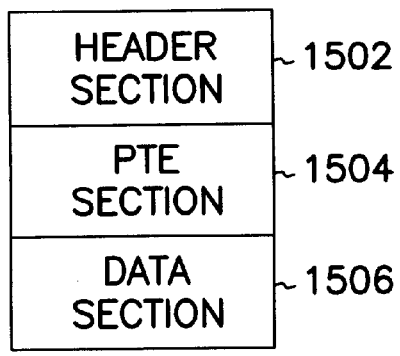
FIG. 15 is a diagram illustrating a file format of a file used in saving pages of a volatile memory to a secondary storage.

Subsequently, the smart hibernation process has operating system 416 write the pages to be saved as a file out to hibernated file 414 in secondary storage 410 (block 662), thereby completing this portion of the smart hibernation process. One embodiment of hibernated file 418 is illustrated in FIG. 15. In particular, hibernated file 414 of FIG. 15 includes header section 1502, PTE section 1504 and data section 1506. Header section 1502 is the data copied from hibernated header pages 428. Additionally, PTE section 1504 includes the data copied from PTE table 404, while data section 1506 includes the data copied from copied hibernated pages 420.

Figure 16:
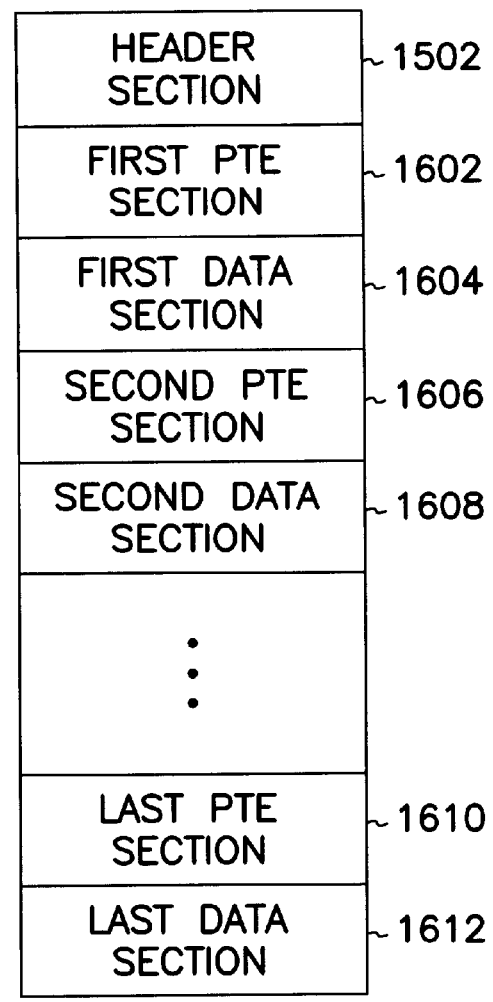
FIG. 16 is a diagram illustrating an alternative file format of a file used in saving pages of a volatile memory to a secondary storage.

An alternative embodiment of hibernated file 414 is illustrated in FIG. 16. In particular, hibernated file 418 of FIG. 16 includes header section 1502, first PTE section 1602, first data section 1604, second PTE section 1606, second data section 1608, last PTE section 1610 and last data section 1612. The header sections between FIGS. 15 and 16 are equivalent. However, this embodiment of hibernated file 414 modifies its storage of the PTEs and the hibernated pages.

In particular, the PTEs and hibernated pages are partitioned and interwoven between each other within hibernated file 414. First data section 1604 includes a portion of the pages copied from copied hibernated pages 420, while first PTE section 1602 includes the corresponding PTEs for these pages stored in first data section 1604. Similarly, second data section 1608 includes another portion of the pages copied from copied hibernated pages 420, while second PTE section 1606 includes the corresponding PTEs for these pages stored in second data section 1608. This partitioning and interweaving of the PTEs and hibernated pages continues until all of the PTEs and hibernated pages are copied into hibernated file 414. In particular, last data section 1612 includes the last portion of the pages copied from copied hibernated pages 420, while last PTE section 1610 includes the corresponding PTEs for these pages stored in last data section 1612.

Advantageously, this file format quickens the restoration process of smart hibernation, especially for hibernated files that are large in size (e.g., more than one Megabyte). In today's computing systems as well as those systems in the future, this file format proves particularly useful as the volatile memory on computing systems continues to grow larger in size with each new generation of such systems. In particular, the loader of computer 418 can read hibernated file 414 sequentially from secondary storage 410 instead of the loader having to alternate locations within hibernated file 414 for the reading of the PTEs and the data pages during the restoration of the pages from secondary storage 410 back to volatile memory 402.

In one embodiment, the size of the PTE sections and the data sections are such that these sections are aligned along the cluster boundaries of the particular secondary storage on which the smart hibernation process is running. In one embodiment in which the size of clusters of a particular secondary storage are 4 kilobytes, the size of a PTE is 4 bytes, and the size of a page is 4 kilobytes, the PTE and the data sections of hibernated file 414 are aligned along 4 kilobyte boundaries. In particular, the PTE sections are 4 kilobytes in size (i.e., 1000 PTEs), and the data sections are 4000 kilobytes in size (i.e., 1000 pages), which correspond to 1000 PTEs. In one such embodiment, header section 1502 must be taken into account in order to align the PTE sections and the data sections on the cluster boundaries of the secondary storage. In particular, first PTE section 1602 and first data section 1604 are smaller in size in order for hibernated file 414 to stayed aligned on the cluster boundaries of secondary storage 410.

For example if header section 1502 is 1.6 kilobytes in size, in order for header section 1502 and first PTE section 1602 to end on a 4 kilobyte boundary and thus stay aligned, first PTE section 1602 could only be 2.4 kilobytes in size (i.e., 600 PTEs). Accordingly, first data section 1604 holds 600 pages (i.e., 2400 kilobytes), which correspond to those 600 PTEs. Therefore, the end of both first PTE section 1602 and first data section 1604 are aligned on a 4-kilobyte boundary. Moreover, because these PTE sections are 4 kilobytes in size while these data sections are 4000 kilobytes in size, these sections are also aligned on 4-kilobyte boundaries. However, it is important to appreciate that the partitioning of the PTEs and the hibernated pages is not limited to any particular size and can vary depending on boundaries of the clusters for the particular secondary storage on the computer on which the smart hibernation process is running.

Moreover, hibernated file 414 is advantageously not required to be contiguous within secondary storage 410. In an exemplary embodiment, the smart hibernation process performs this write operation by using regular disk services provided by the operating environment. Regular disk services include reading and writing from and to a secondary storage media. Advantageously, the smart hibernation process can use the regular disk services because hibernation module pages 426 are not part of the hibernated pages being written to disk. Therefore, the state of the disk driver will not modify itself as the smart hibernation process saves the hibernated pages. Additionally upon restoration of computer 418, the state of the disk driver is the same as its state prior to the writing of the hibernated pages to secondary storage 410.

In one embodiment, hibernated file 414 is reused. In such an embodiment, once hibernated file 414 has been created for one smart hibernation process the subsequent invocations of the smart hibernation process reuse the same file if the size of the file is sufficient to retain the information to be written thereto. The assumption that the size of hibernated file 414 remains constant across multiple invocations of the smart hibernation process tends to hold true, as computer users are typically consistent on the amount of memory usage from session to session. Advantageously, this reuse of hibernated file 414 reduces the amount of time required to execute the smart hibernation process by eliminating the time required to pre-allocate such a file. Computer 418 is then powered down.

Figure 7:
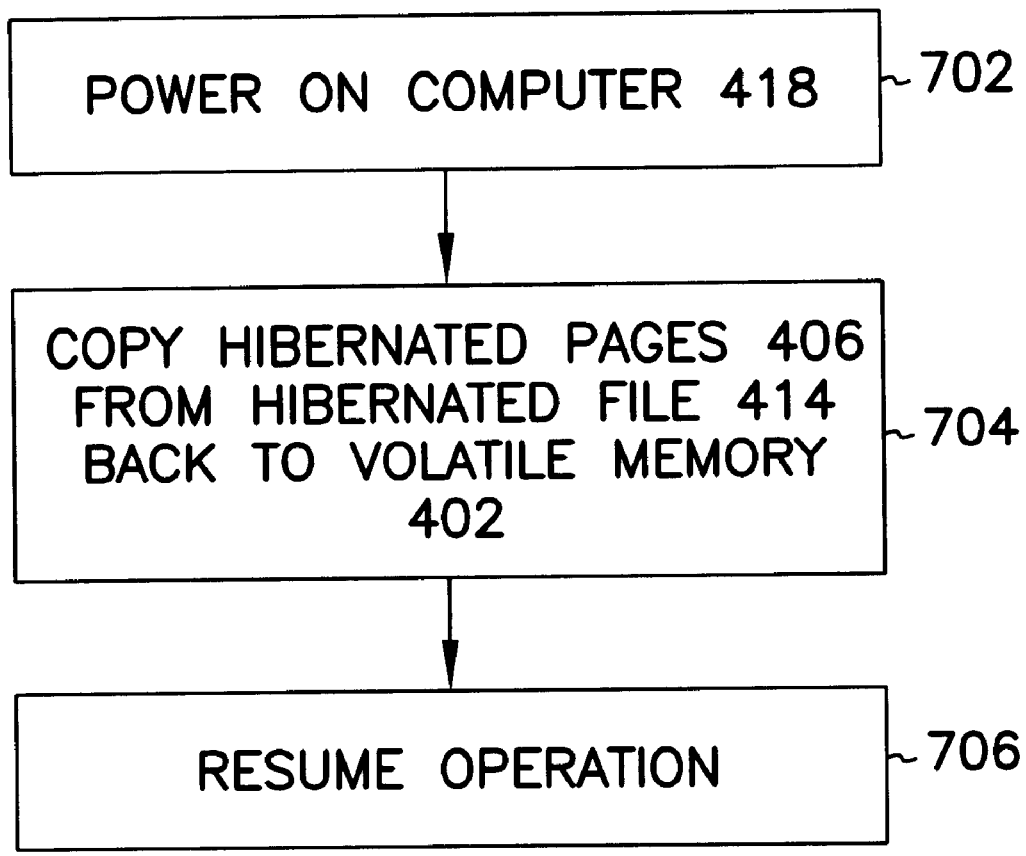
FIG. 7 is a flowchart of a method of restoration for a computer having a volatile memory with no reserved portions according to an embodiment of the invention.

An exemplary embodiment of a method to restore a computer state saved after the smart hibernation process is shown in FIG. 7. Once computer 418 is powered on (block 702), the smart hibernation process is invoked to restore volatile memory 402 back to its state just prior to the invocation of the smart hibernation process. The restoration process restores the state of volatile memory 402 by copying each hibernated page from hibernated file 414 residing in secondary storage 410 to its original location in volatile memory 402 specified by its corresponding PTE in PTE table 404, also residing in hibernated file 414 (block 704). Subsequently, computer 418 resumes operation at the same point as when the smart hibernation process was invoked (block 706).

Figure 8A:
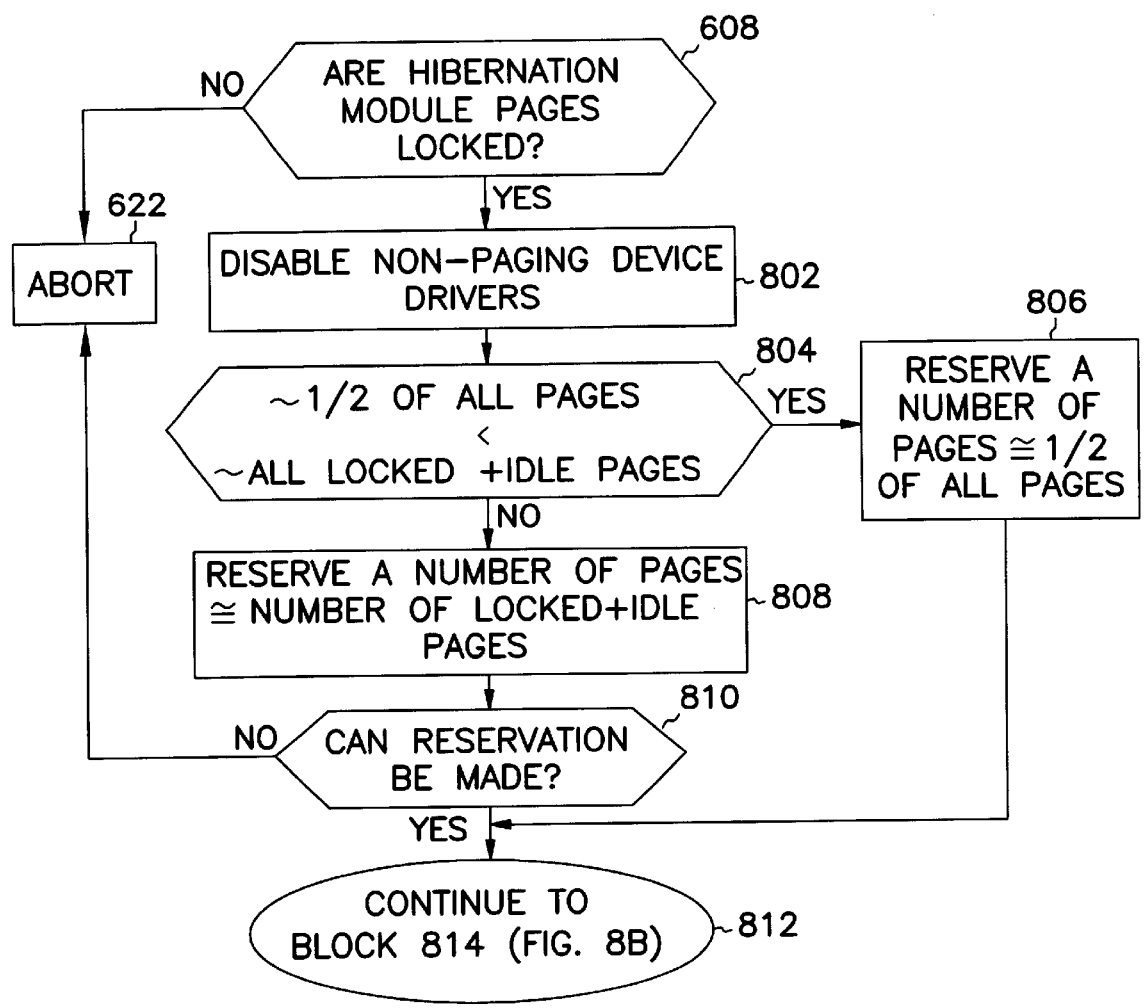
FIGS. 8A–8B are flowcharts of an alternative method of hibernation for a computer having a volatile memory with no reserved portions according to an embodiment of the invention.
Figure 8B:
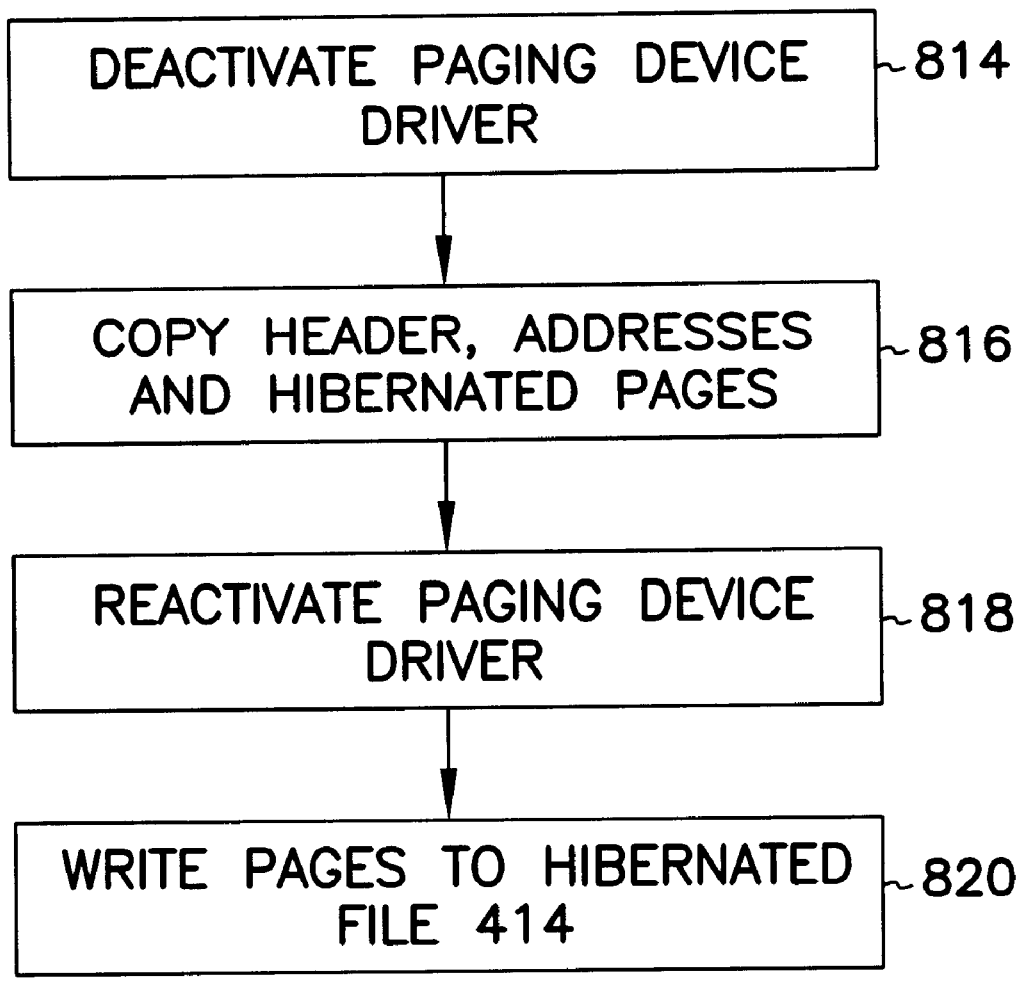

Referring to FIGS. 8A–8B, a flowchart of an alternative method of hibernation to be performed by a computer according to an embodiment of the invention is shown and explained with reference to computer 418 along with its components illustrated in FIG. 4. This method begins with the invocation of the smart hibernation process (e.g., by a computer user, as described above). Upon invocation, instructions for the smart hibernation process are dynamically locked into pages of volatile memory, 402 (i.e., hibernation module pages 426) (block 608 ). If operating system 416 is unable to lock hibernation module pages 426, operating system 416 aborts the smart hibernation process and returns an error (block 622). Once operating system 416 locks the smart hibernation module into hibernation module pages 426 within volatile memory 402, the smart hibernation process suspends activity by all device drivers on computer 418, except for activities by the paging device driver of computer 418 (block 802). These paging activities include the swapping of pages of volatile memory 402 from and to swap file 412 on secondary storage 410, as is well known in the art.

The smart hibernation process determines the lesser of (1) the sum of one-half of all of the pages of volatile memory 402 plus the number of pages to save the header plus the number of pages needed to save a PTE for all of the pages in one-half of the memory versus (2) the sum of the number of locked and idle pages plus a predetermined number of pages to save the header and a PTE for the locked and idle pages (block 804). In one embodiment, this predetermined number of pages to save the header and the PTE for the locked and idle pages is one Megabyte. However, it is important to appreciate that this predetermined number of pages may be any value that allows for a sufficient number of pages to save the header and a PTE for all of the locked and idle pages in volatile memory 402.

If the latter sum is less than the former, the smart hibernation process reserves a number of pages (i.e., copied hibernated pages 420) in volatile memory 402 equaling the latter sum (i.e., the sum of the number of locked and idle pages plus a predetermined number of pages to save the header and a PTE for the locked and idle pages) (block 806). However, if the former sum is less than the latter, the smart hibernation process reserves a number of pages (i.e., copied hibernated pages 420) in volatile memory 402 equaling the former sum (i.e., the sum of one-half of all of the pages of volatile memory 402 plus the number of pages to save the header plus the number of pages needed to save a PTE for all of the pages in one-half of the memory) (block 808 ).

As previously described above with reference to FIG. 6D, if the smart hibernation process is unable to reserve the requisite number of pages in volatile memory 402, the process pushes a sufficient number of pages out to swap file 412 in order to free up enough pages in volatile memory 402 to reserve the requisite number of pages. In particular as previously described, the smart hibernation process attempts to use the free pages in volatile memory 402 in order to reserve the sufficient number of pages to make the duplicate image. However, if there are an insufficient number of free pages, the smart hibernation process pushes a sufficient number of idle pages out to swap file 412 in order to reserve the requisite number of pages in volatile memory 402 to make a duplicate image of the locked and idle pages in volatile memory 402 (i.e., copied hibernated pages 420).

The smart hibernation process then determines if the reservation of the requisite number of pages in volatile memory 402 was made (block 810). If the reservation could not be made, the smart hibernation process is aborted (block 622). One example why a reservation could not be made, as discussed above, could be that the number of locked pages in volatile memory 402 is greater than one-half of all the pages in volatile memory. By definition, locked pages cannot be pushed out to swap file 412 from volatile memory 402, and accordingly, the requisite number of pages could not be freed in volatile memory 402 for the reservation.

If the reservation of the requisite number of pages is made, the smart hibernation process continues (block 812) and deactivates the paging device driver of computer 418 (block 814), illustrated in FIG. 8B. The smart hibernation process then (1) creates and copies the header into hibernated header pages 428, an exemplary embodiment of which is illustrated in FIG. 13, (2) copies the address for each of the hibernated pages into PTE table 404 and (3) copies hibernated pages 406 of volatile memory 402 into copied hibernated pages 420 (block 816); all of which are described above in conjunction with FIGS. 6A–6E. Moreover, the smart hibernation process frees any pages that were locked for this duplication but not used to hold the duplicate image.

Subsequently, the smart hibernation process writes these page to hibernated file 414 by reactivating the paging device driver and instructing this driver to perform this write operation (block 818 ). The smart hibernation process writes hibernated header pages 428, PTE table 404 and copied hibernated pages 420 to hibernated file 414 on secondary storage 410 (block 820). In one embodiment, the smart hibernation process writes hibernated header pages 428, PTE table 404 and copied hibernated pages 420 into hibernated file 414 in a file format illustrated in FIG. 13. In an alternative embodiment, the smart hibernation process writes hibernated header pages 428, PTE table 404 and copied hibernated pages 420 into hibernated file 414 in a file format illustrated in FIG. 14.

In one embodiment, a bit (i.e., a flag) in volatile memory 402 is used in conjunction with the activation and reactivation of the paging device driver. If this bit is turned off, the paging device driver performs its normal functionality as occurs when the paging device driver is turned back on. In particular, in this embodiment, the paging device driver performs the restoration from the hibernation and other procedures associated with initializing computer 418. However, if this bit is turned on when the paging device driver is reactivated, this driver performs special functionality. In particular, the paging device driver copies copied hibernated pages 420 to hibernated file 414 and then computer 418 is powered off, thereby completing this portion of the hibernation. Advantageously, this allows the paging device driver to perform two different sets of functionality on reactivation depending on the value of this particular bit in volatile memory 402.

Advantageously, this embodiment illustrated in FIGS. 8A–8B provides for the reserving of one-half of volatile memory 402 unless, in general, the number of locked and idle pages is less than one-half of volatile memory. For example, if volatile memory 402 was two Gigabytes in size and only 64 of these Megabytes of volatile memory 402 were locked or idle, it would be unnecessary to reserve one-half of volatile memory 402, as only 64 Megabytes plus the number of pages required to save the header and the PTEs for these 64 Megabytes, which is small in comparison, is needed. On the other hand, the smart hibernation process is not required to reserve more than just over half of volatile memory 402 in order to make a duplicate image of the locked and idle pages in volatile memory 402, as any other idle pages have already been pushed out to swap file 412 in order to reserve a sufficient number of pages in volatile memory 402 to make a duplicate image of the locked pages and the idle pages remaining.

While still providing a balance between the saving of the pages of volatile memory 402 between swap file 412 and hibernated file 414, this embodiment illustrated in FIGS. 8A–8B, in contrast, to the embodiment described in conjunction with FIGS. 6A–6E does not perform an iterative process of reserving (i.e., committing) pages for the duplicate image. In particular, this embodiment performs one "reserve" for the duplicate image. Moreover, the restoration of the computer state of computer 418 after this embodiment of the smart hibernation process is equivalent to the restoration process illustrated in FIG. 7, which is also used in conjunction with the smart hibernation process illustrated in conjunction with FIGS. 6A–6E.

Hibernation of a Volatile Memory Having Reserved Portions

Figure 11A:
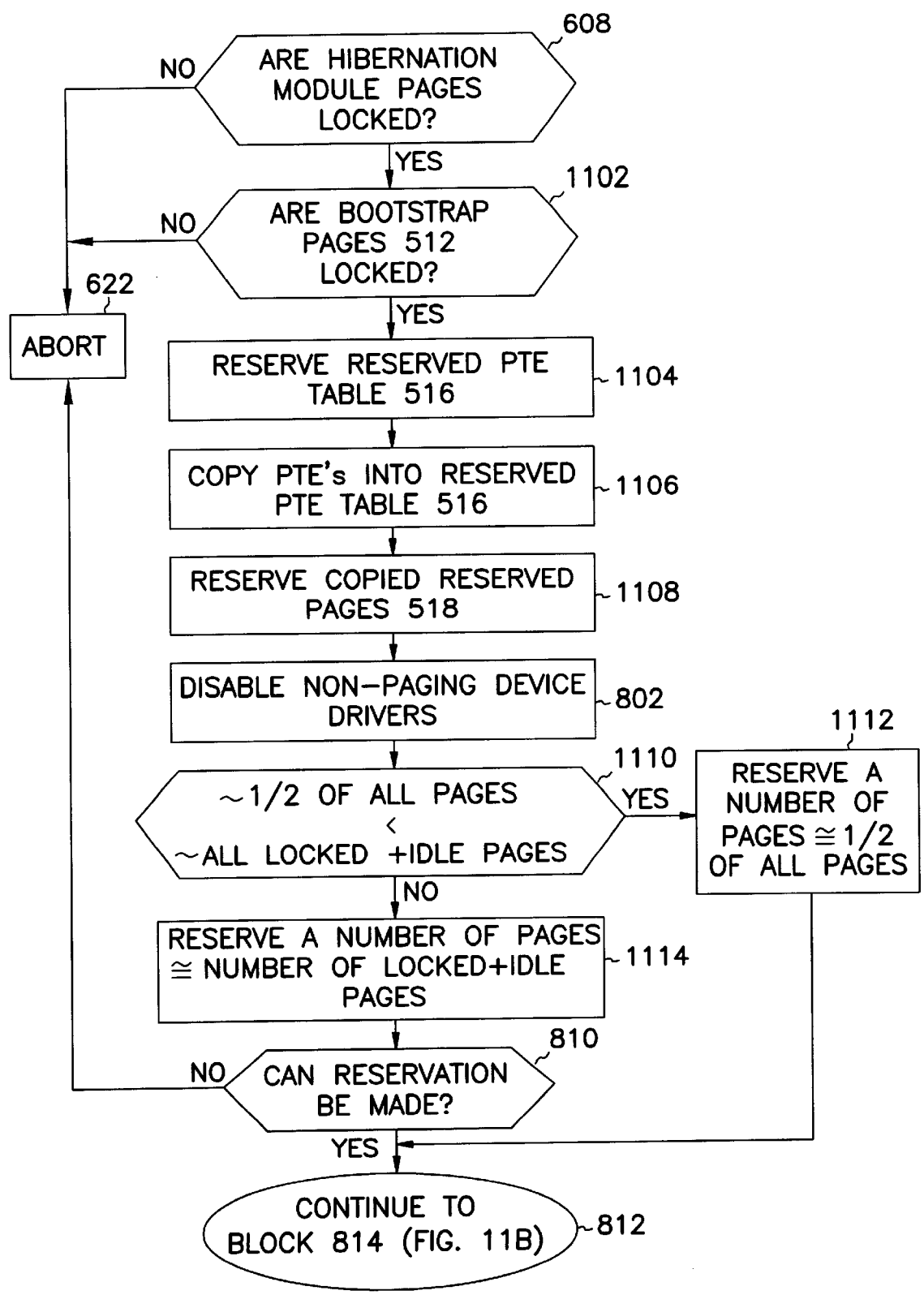
FIGS. 11A–11B are flowcharts of an alternative method of hibernation for a computer having a volatile.memory with reserved portions according to an embodiment of the invention.
Figure 11B:
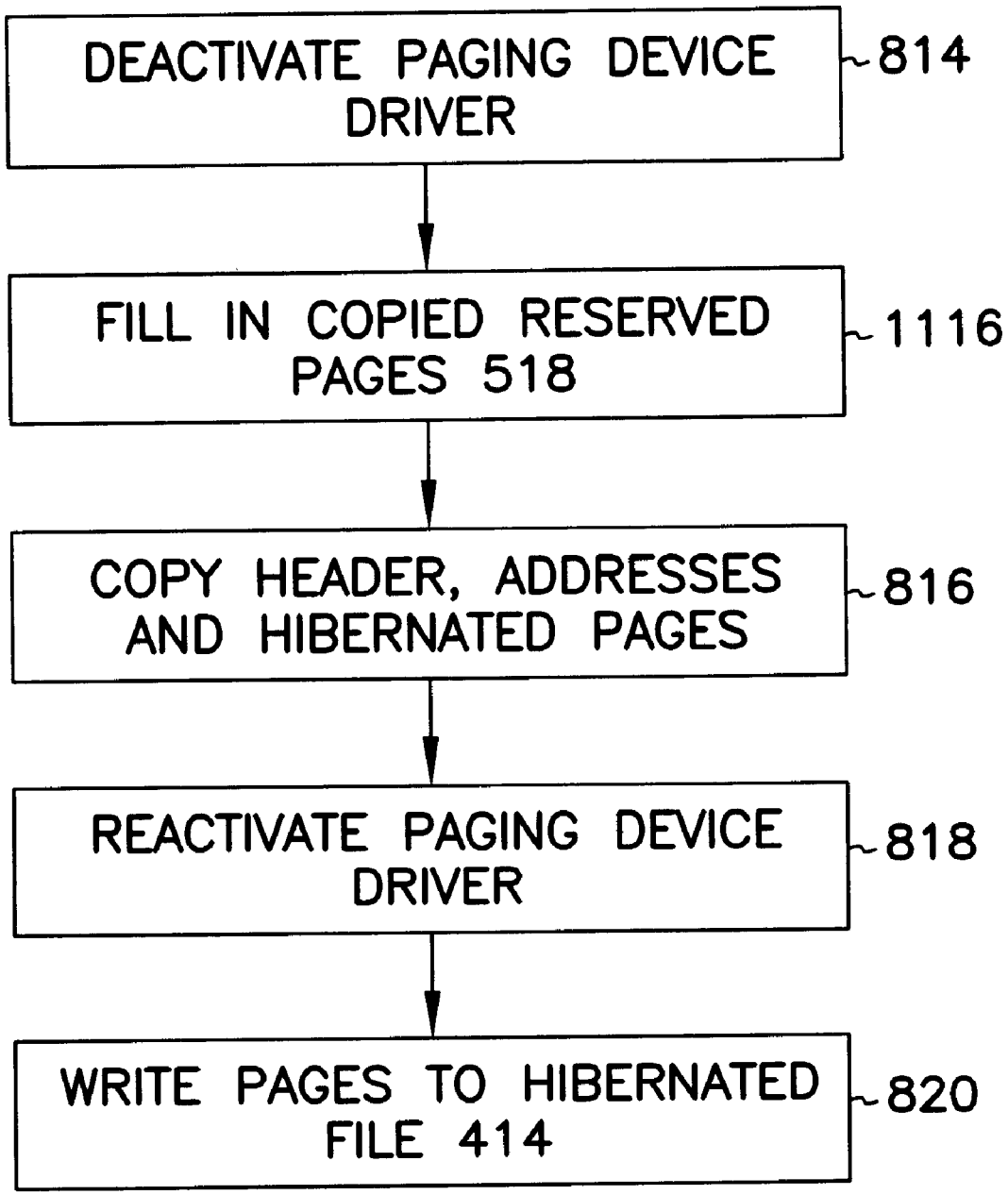

In accordance with another embodiment of the invention, the above-described smart hibernation processes are modified to accommodate volatile memory having reserved portions (e.g., volatile memory 402 shown in FIG. 5). In particular, the smart hibernation process described in conjunction with FIGS. 6A–6E are modified as shown in FIGS. 9A and 9B, while the smart hibernation process described in conjunction with FIGS. 8A–8B are modified as shown in FIGS. 11A–11B. The modification of the smart hibernation process related to FIGS. 6A–6E is first described.

The method shown in FIGS. 6B and 6E are modified, as illustrated by FIGS. 9A and 9B, respectively. Moreover, the reduction and checking process of the smart hibernation process illustrated in FIGS. 6C and 6D, however, remains unchanged. Therefore, the sequence for this particular embodiment begins with the processing shown in FIG. 9A, followed by the processing illustrated in FIGS. 6C and 6D and finishing with the processing shown in FIG. 9B. FIGS. 9A and 9B include the blocks of FIGS. 6B and 6E, respectively, and also the additional blocks needed to accommodate volatile memory having reserved portions.

FIG. 9A illustrates the preparation for the subsequent reduction and checking process for volatile memory having reserved portions according to an exemplary embodiment of the invention. Subsequent to locking the smart hibernation module into non-reserved memory 504 (block 608), the smart hibernation process locks a number of pages in reserved memory 502, forming bootstrap pages 512 (block 902). If there are not enough pages available in reserved memory 502 such that the smart hibernation process cannot lock bootstrap pages 512 therein, operating system 416 aborts the smart hibernation process and returns an error (block 622).

The smart hibernation process uses bootstrap pages 512 during the subsequent restoration of hibernated pages 406 to non-reserved memory 504. In particular, smart hibernation process places a copy module into bootstrap pages 512. The copy module in turn copies the hibernated pages previously located in reserved memory 502 of volatile memory 402 from non-reserved memory 504 back to the original location (i.e., their location prior to the invocation of the smart hibernation process) in reserved memory 502. Moreover, the smart hibernation process maintains the address of bootstrap pages 512 to allow for the placement of the copy module into bootstrap pages 512 during the subsequent restoration. If a sufficient number of pages are available in reserved memory 502 to reserve the requisite number of pages for bootstrap pages 512, the smart hibernation process continues. The process determines the total number of pages in non-reserved memory 504 (block 610).

Additional modifications to the portion of the smart hibernation process illustrated in FIG. 6B are made prior to disabling interrupts and other processors (block 614). The smart hibernation process reserves the requisite number of pages within non-reserved memory 504, forming reserved PTE table 508 (block 904). The smart hibernation process then copies a PTE for each page in reserved memory 502 into reserved PTE table 508 (block 906). Moreover, the requisite number of free pages are reserved within non-reserved memory 504 to form copied reserved pages 506 to be used subsequently to copy the pages of reserved memory 502 therein (block 908). After disablement of interrupts and other processors, the smart hibernation continues to the reduction and checking process of FIGS. 6C and 6D.

The reduction and checking process illustrated in FIGS. 6C and 6D remains unchanged for a volatile memory having reserved portions. As previously described, the reduction and checking process completes under one of two conditions: (1) the reduction and checking process successfully committed (i.e., reserved) a sufficient number of pages for the copy process and the smart hibernation process continues or (2) the reduction and checking process was not successful in making the commitment of the requisite pages and the operating system aborts the smart hibernation process completely.

If that the commitment is made, FIG. 9B illustrates the duplication and saving of the requisite number of pages in volatile memory having reserved portions according to an embodiment of the invention. Prior to actual creation of the duplicate image (block 654) within non-reserved memory 504, the smart hibernation process duplicates the pages within reserved memory 502 into copied reserved pages 506 within non-reserved memory 504 (block 912). The execution of block 912 prior to block 654 allows the pages within copied reserved pages 506, which are considered locked and thus part of the image of the hibernated pages, to be duplicated (i.e., to be a part of copied hibernated pages 420) and saved to hibernated file 418.

Subsequent to the smart hibernation process (1) filling in PTE table 404 (block 656), (2) reenabling the interrupts and other processors (block 658), and (3) filling in hibernated header pages 428 (block 660), the process copies the pages to be subsequently saved from non-reserved memory 504 to hibernated file 414 (block 660 and block 662). Moreover, in addition to the information previously described to be placed into hibernated header pages 428 with reference to FIG. 13, the copy module that will be copied into bootstrap pages 512 during the subsequent restoration is also included into hibernated header pages 428.

Figure 14:
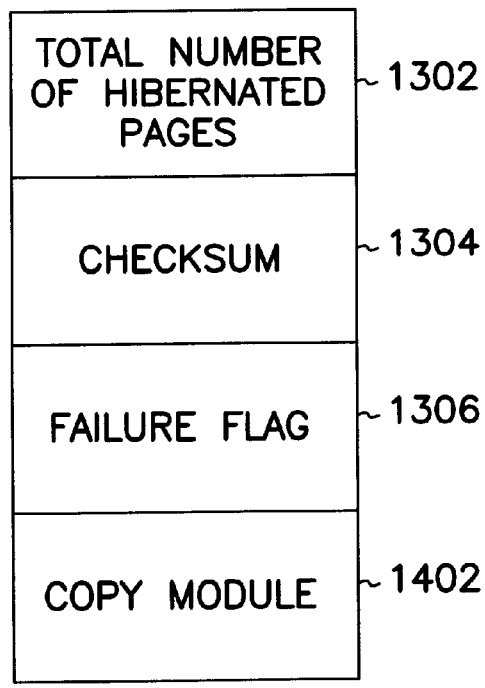
FIG. 14 is a diagram illustrating a data structure for a header for a volatile memory with reserved portions according to an embodiment of the invention.

In particular, an exemplary embodiment for hibernated header pages 428 is shown in FIG. 14 for volatile memory having a reserved portion. The header placed into hibernated header pages 428 includes, but is not limited to, (1) the number of hibernated pages saved in hibernated file 418 (block 1302), (2) a checksum to be used in the restoration process to ensure that the data written out to hibernated file 414 has not been corrupted (block 1304), (3) a failure flag (block 1306) and (4) the copy module that will be copied into bootstrap pages 512 (block 1402). Subsequent to the execution of block 662, the smart hibernation process is complete and computer 418 can power down.

Figure 10:
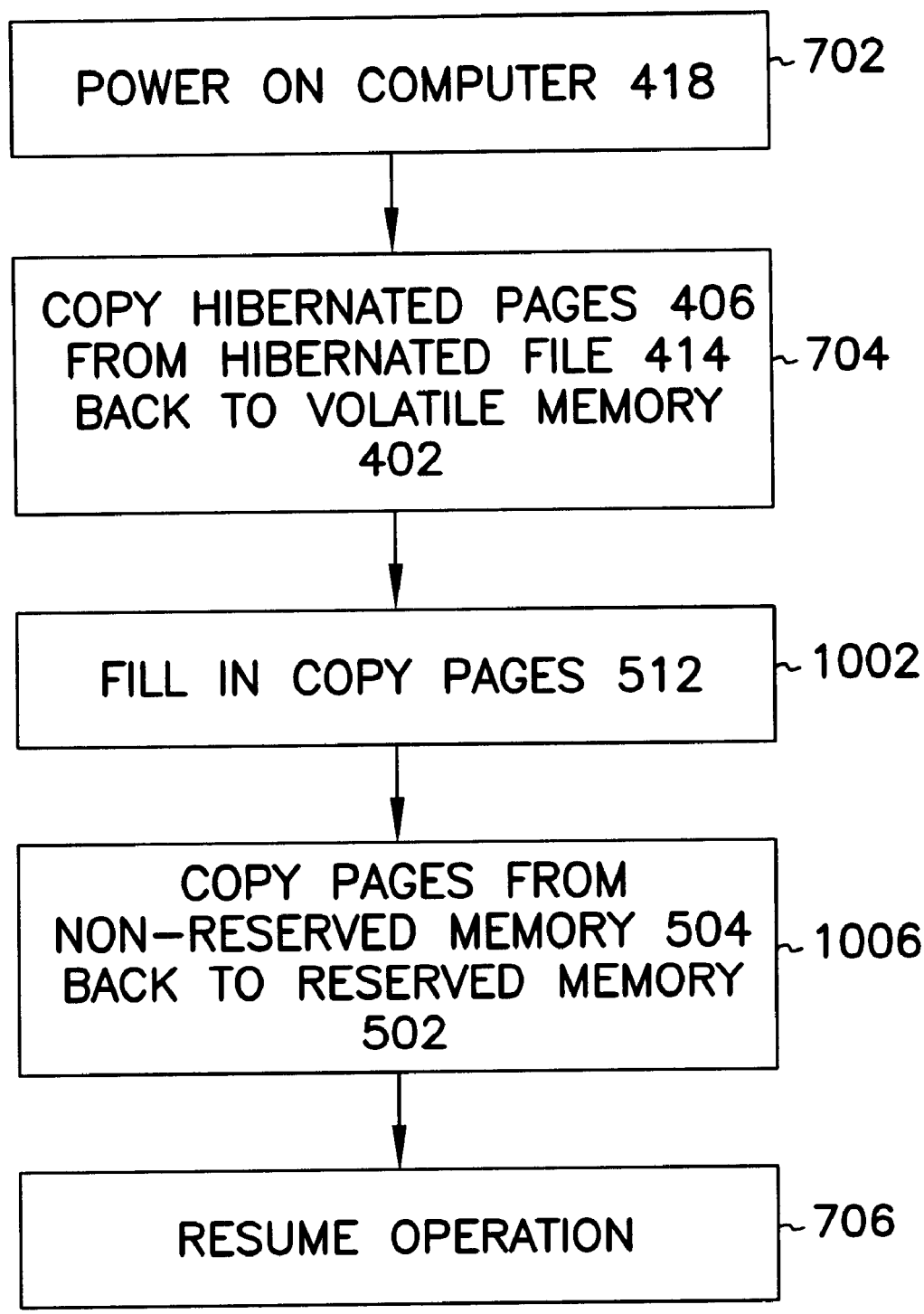
FIG. 10 is a flowchart of a method of restoration for a computer having a volatile memory with reserved portions according to an embodiment of the invention.

In accordance with an exemplary embodiment of the invention shown in FIG. 10, the above-described method of restoration after the smart hibernation process of FIG. 7 is also modified to accommodate volatile memory having reserved portions. One embodiment of volatile memory having reserved portions is shown in FIG. 5. FIG. 10 includes the blocks of FIG. 7 as well as the additional blocks needed to accommodate volatile memory having reserved portions. Subsequent to restoration of the hibernated pages within non-reserved memory 504 (block 704), the smart hibernation process places the copy module into bootstrap pages 512 (block 1002). The copy module is then executed to restore all the pages within reserved memory 502 from the copies in the locked pages within non-reserved memory 504 (block 1006). The restoration of volatile memory 402 is then complete, and computer 418 resumes operation.

In accordance with another embodiment of the invention, the above-described smart hibernation processes are modified to accommodate volatile memory having reserved portions. In particular, the smart hibernation process described in conjunction with FIGS. 8A–8B is modified as shown in FIGS. 11A and 11B. FIGS. 11A and 11B include the blocks of FIGS. 8A and 8B, respectively, and also the additional processing blocks needed to accommodate volatile memory having reserved portions. One embodiment of volatile memory 402 having reserved potions is shown in FIG. 5.

Subsequent to locking the smart hibernation module into non-reserved memory 504 (block 608), the smart hibernation process locks a number of pages in reserved memory 502, forming bootstrap pages 512, which have been described above in conjunction with block 902 of FIG. 9A (block 1102). If there are not enough pages available in reserved memory 502 such that the smart hibernation process cannot lock bootstrap pages 512 therein, operating system 416 aborts the smart hibernation process and returns an error (block 622).

Additional modifications to the portion of the smart hibernation process illustrated in FIG. 8A are made prior to disabling nonpaging device drivers (block 802). The smart hibernation process reserves the requisite number of pages within non-reserved memory 504, forming reserved PTE table 508 (block 1104). The smart hibernation process then copies a PTE for each page in reserved memory 502 into reserved PTE table 508 (block 1106). Moreover, the requisite number of free pages are reserved within non-reserved memory 504 to form copied reserved pages 506 to be used subsequently to copy the pages of reserved memory 502 therein (block 1108). The smart hibernation process continues by disabling the nonpaging device drivers (block 802) and determining the lesser of (1) the sum of one-half of all of the pages of in non-reserved memory 504 plus the number of pages to save the header plus the number of pages needed to save a PTE for all of the pages in one-half of the memory versus (2) the sum of the number of locked and idle pages in non-reserved memory 504 plus a predetermined number of pages to save the header and a PTE for the locked and idle pages (block 1110). Based on the result determined at block 1110, the smart hibernation process attempts to reserve pages in non-reserved memory 504 equaling the lesser of these two values (block 1112 or block 1114).

The smart hibernation process then determines if the reservation of the requisite number of pages in volatile memory 402 was made (block 810). If the reservation could not be made, the smart hibernation process is aborted (block 622). If the reservation of the requisite number of pages is made, the smart hibernation process continues (block 812) and deactivates the paging device driver of computer 418 (block 814), illustrated in FIG. 11B.

Prior to creating the duplicate image (block 816) within non-reserved memory 504, the smart hibernation process duplicates the pages within reserved memory 502 into copied reserved pages 506 within non-reserved memory 504 (block 1116). This sequence of having block 1116 prior to block 816 allows the pages within copied reserved pages 506, which are considered locked and thus part of the image of the hibernated pages, to be duplicated (i.e., to be a part of copied hibernated pages 420) and saved to hibernated file 414. The smart hibernation process then (1) creates and copies the header into hibernated header pages 428, an exemplary embodiment of which is illustrated in FIG. 13, (2) copies the address for each of the hibernated pages into PTE table 404 and (3) copies hibernated pages 406 of volatile memory 402 into copied hibernated pages 420 (block 816); all of which are described above in conjunction with FIGS. 9A–9B. Moreover, the smart hibernation process frees any pages that were locked for this duplication but not used to hold the duplicate image.

Subsequently, the smart hibernation process writes these pages to hibernated file 414 by reactivating the paging device driver and instructing this driver to perform this write operation (block 818). The smart hibernation process writes hibernated header pages 428, PTE table 404 and copied hibernated pages 420 to hibernated file 414 on secondary storage 410 (block 820). In one embodiment, the smart hibernation process writes hibernated header pages 428, PTE table 404 and copied hibernated pages 420 into hibernated file 414 in a file format illustrated in FIG. 13. In an alternative embodiment, the smart hibernation process writes hibernated header pages 428, PTE table 404 and copied hibernated pages 420 into hibernated file 414 in a file format illustrated in FIG. 14. Moreover, the restoration of the computer state of computer 418 after this embodiment of the smart hibernation process has been performed is equivalent to the restoration process illustrated in FIG. 10, which is also used in conjunction with the smart hibernation process illustrated in conjunction with FIGS. 9A–9B.

Implementation

In this section of the detailed description, a particular implementation of the smart hibernation process is described that is specific to a computer running MICROSOFT® Corporation's WINDOWS® 98. In a computer having 16 Mbytes of volatile memory with each page therein being four Kbytes, the total number of pages is 4,000. The number of locked pages is 1500. Additionally, portions of two applications are residing in the volatile memory such that 1000 idle pages are dedicated to each application. Volatile memory will then consist of 3500 hibernated pages (1500 locked pages and 2000 idle pages) along with 500 free pages.

In one embodiment illustrated in FIGS. 6A–6E, the smart hibernation process initially would be unable to reserve the number of required pages to create the duplicate image of the 3500 hibernated pages within the volatile memory, as there are only 500 free pages. The smart hibernation process then attempts to reduce the number of hibernated pages to provide a sufficient number of free pages within the volatile memory to make a copy of the remaining hibernated pages.

The smart hibernation process divides the number of hibernated pages by one-half, leaving 1750 hibernated pages. The smart hibernation process reduces the number of hibernated pages by converting 1750 hibernated pages to free pages by pushing 1750 idle pages out to swap file 412 located in secondary storage 410. The number of free pages, therefore, which can be used to create the duplicate image of the remaining hibernated pages, is 2250 (i.e., the original 500 free pages+the previous idle pages converted to free 1750 pages). Because the number of free pages is greater than the number of remaining hibernated pages (i.e., 2250 pages>1750 pages), the requisite number of free pages are available to create the duplicate image of the remaining number of hibernated pages. The smart hibernation process then copies the remaining hibernated pages into these reserved pages and saves this duplicate image along with a page table of addresses and a header to a file on the secondary storage.

In an alternative embodiment illustrated in FIGS. 8A–8B, the smart hibernation process determines the lesser of (1) one-half of all the pages in volatile memory (i.e., 2000 pages) plus additional pages to save a header section and the PTEs for one-half of the pages in volatile memory (e.g., 10 pages) or (2) all of the pages in volatile memory that are locked or idle (i.e., 3500 pages) plus additional pages to save a header section and the PTEs for the hibernated pages. Because the former is less than the latter, the smart hibernation process attempts to reserve that a number of pages in volatile memory equaling the former amount (i.e., 2010 pages).

However, because only 500 pages are free, the smart hibernation process attempts to reduce the number of hibernated pages to provide a sufficient number of free pages within the volatile memory to make a copy of the remaining hibernated pages. In particular, because 1510 more pages need to be free within volatile memory in order to make the duplicate image of 2000 hibernated pages, the smart hibernation process attempts to push 1510 idle pages from volatile memory out to the swap file on secondary storage.

Accordingly, because the volatile memory has a total of 2000 idle pages, the smart hibernation process is able to successfully push the requisite amount of idle pages out to the swap file on secondary storage and thus lock 2010 pages in the volatile memory. Subsequently, 2000 hibernated pages (1500 locked pages and 500 idle pages) remain in the volatile memory. The smart hibernation process then duplicates these remaining hibernated pages along with the header section and the PTEs for the remaining hibernated pages into the 2010 pages locked by the smart hibernation process. Subsequently, the smart hibernation process saves this duplicate image to a file (i.e., hibernated file) on the secondary storage.

In accordance with embodiments of the invention, a particular implementation of the smart hibernation process is described that is specific to a computer system executing on an operating system that has volatile memory with reserved portions. In particular, an implementation is described on a computer system executing on the WINDOWS® 98 operating system that has the MS-DOS® (MICROSOFT® Disk Operating System) as a foundation.

Figure 12:
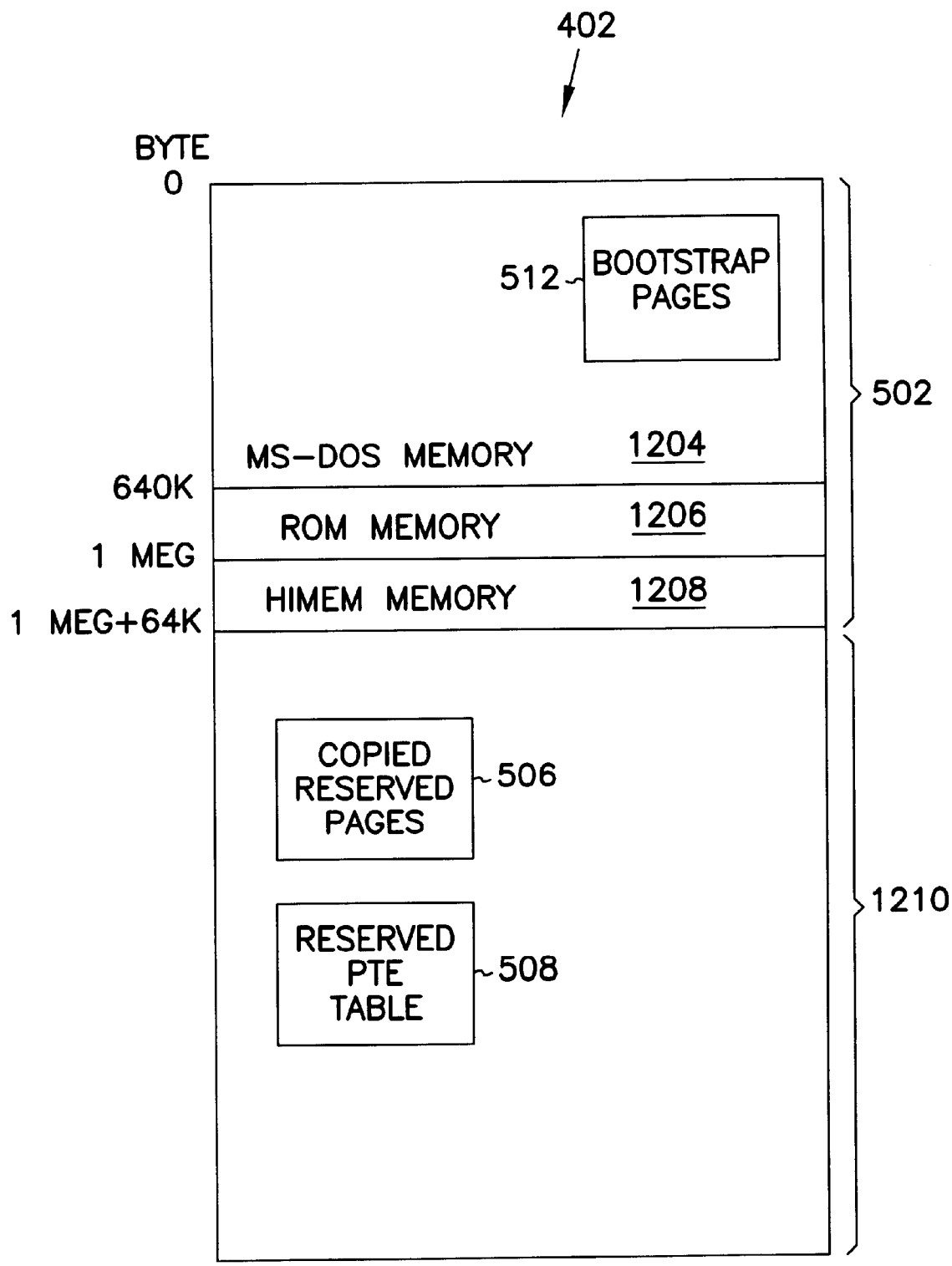
FIG. 12 is a diagram illustrating a volatile memory having reserved portions used by the MS-DOS® (MICROSOFT® Disk Operating System) system.

FIG. 12 illustrates an embodiment of volatile memory 402 used by the MS-DOS® system. In particular, FIG. 12 includes reserved memory 502 and extended memory 1210 within volatile memory 402. All of the pages of volatile memory 402 described in conjunction with FIG. 4 (i.e., operating system 416, PTE table 404, hibernated pages 406, copied hibernated pages 420, hibernation module pages 426 and hibernated header pages 428) are included, but not shown, in extended memory 1210.

Reserved memory 502 is comprised of MS-DOS® memory 1204, ROM memory 1206 and HIMEM memory 1208. MS-DOS® memory 1204 resides from 0 to 640 kilobytes (Kbytes) in volatile memory 402 and includes initialization (i.e., boot) code for MS-DOS®. ROM memory 1206 resides from 640 Kbytes to 1 Megabyte (Mbyte) in volatile memory 402 and includes ROMs and other related types of reserved memory. Additionally, HIMEM memory 1208 resides from 1 Mbyte to 1 Mbyte+64 Kbytes in volatile memory 402 and includes the MS-DOS® operating system code. Extended memory 1210, which resides from 1 Mbyte+ 64 Kbytes and beyond in volatile memory 402, is the nonreserved section of volatile memory 402.

While running in WINDOWS® mode, WINDOWS® 98 makes use of all the pages in volatile memory 402 including pages in reserved memory 502 (0 to 1 Mbyte+64 kbytes), thus hibernated pages could reside in reserved memory 502 at the invocation of the smart hibernation process. However, during the initialization of the computer, the pages in reserved memory 502 cannot be locked, as these pages must be free to initialize the operating system.

Figure 9:
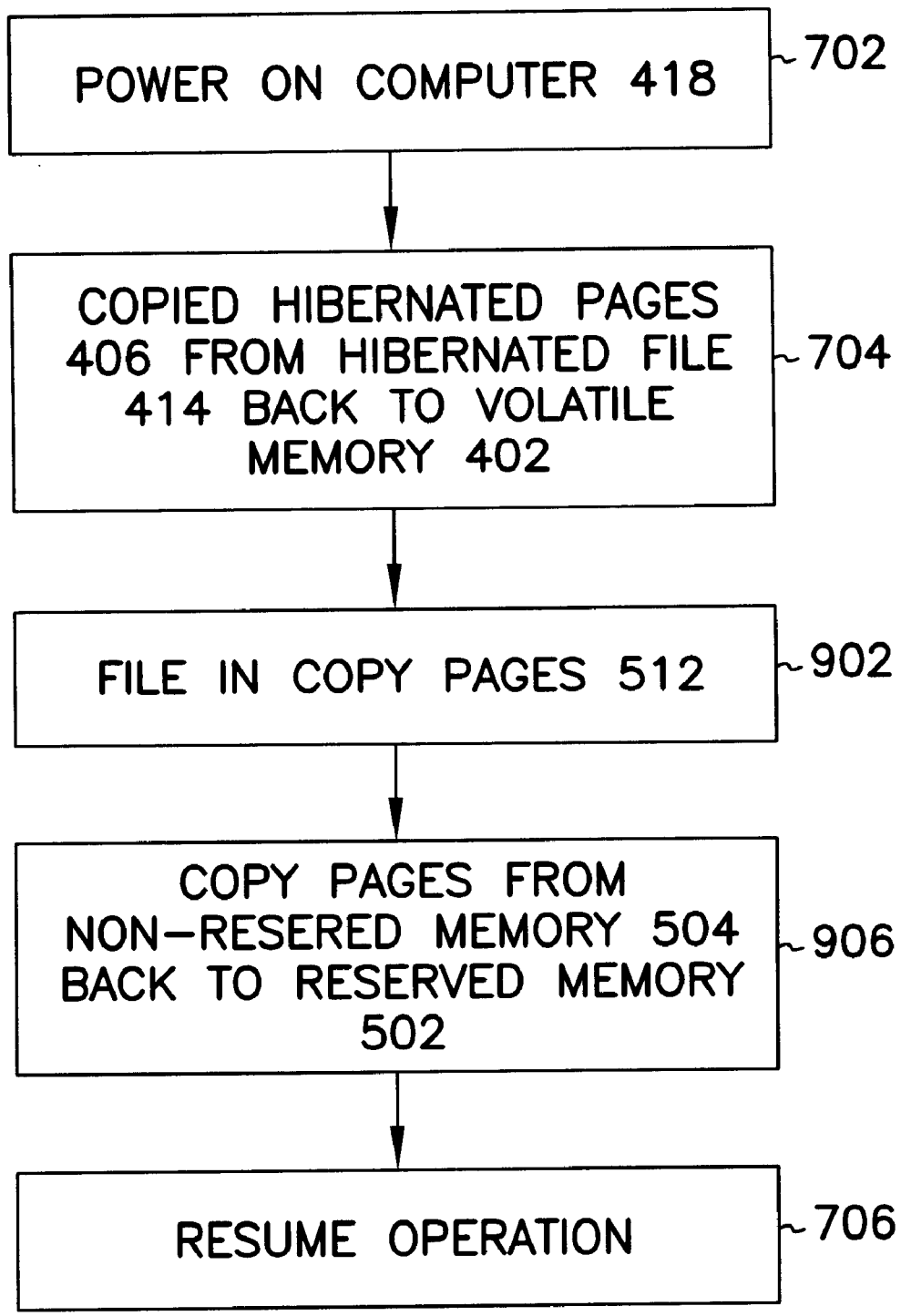
FIGS. 9–9B are flowcharts of a method of hibernation for a computer having a volatile memory with reserved portions according to an embodiment of the invention.
Figure 9A:
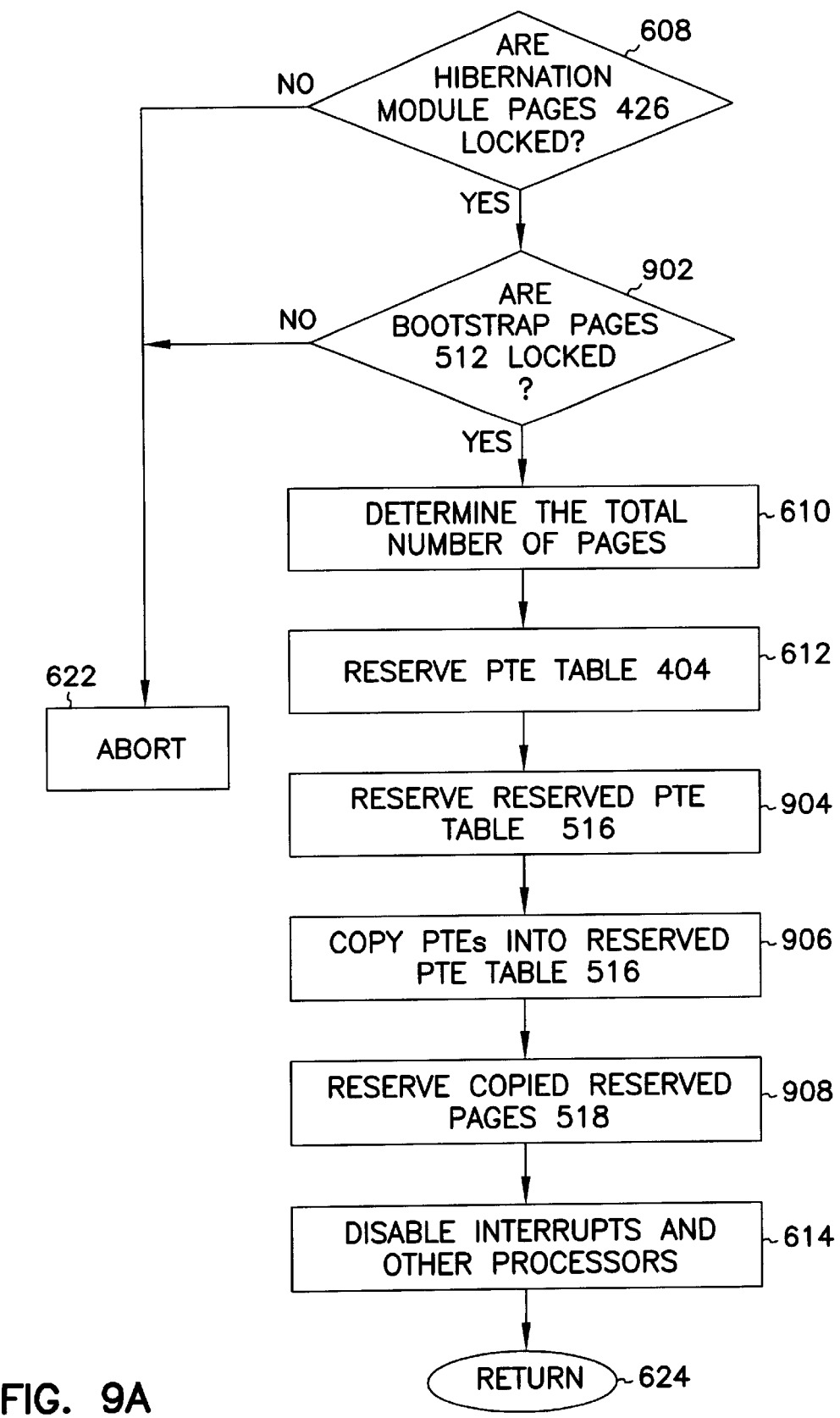
Figure 9B:
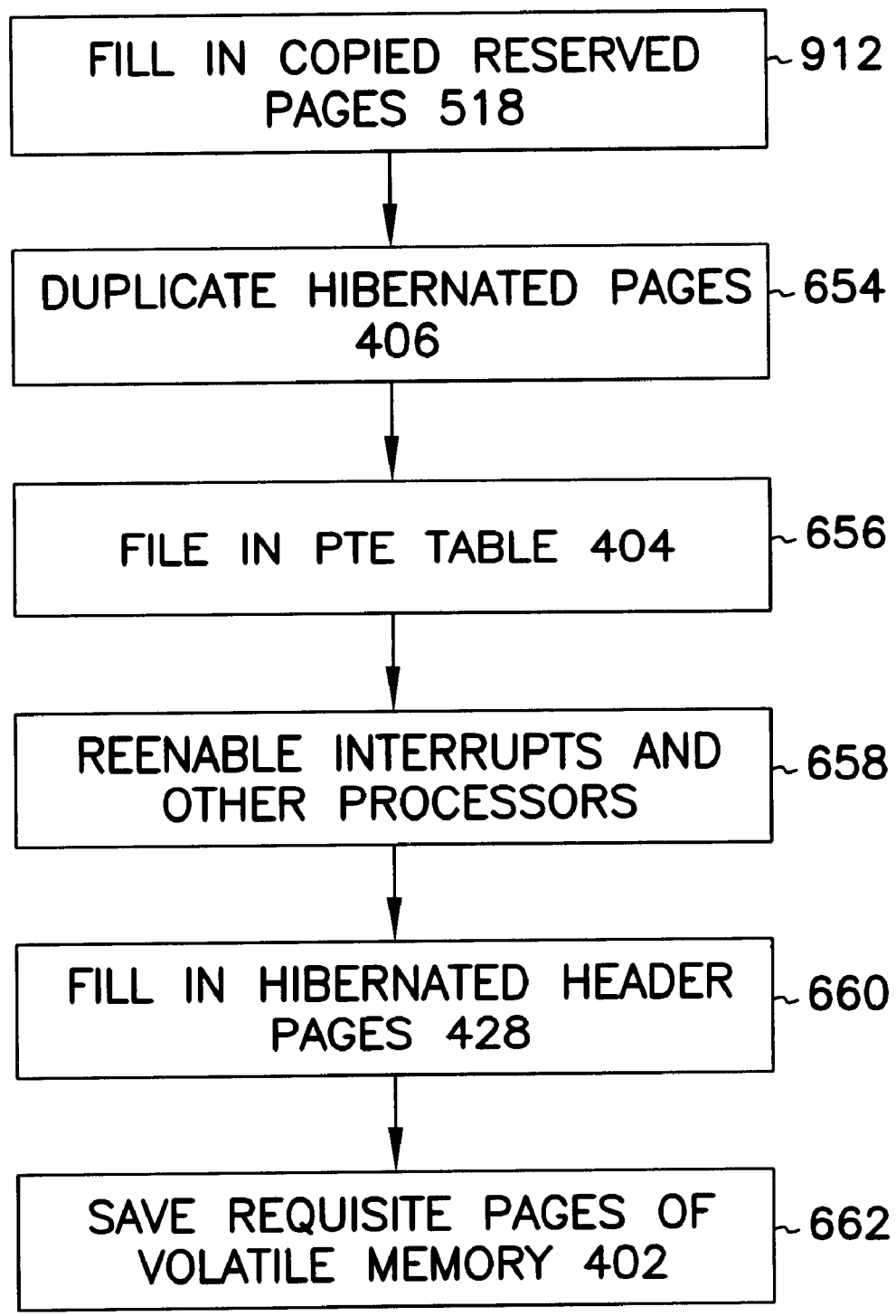

In one embodiment illustrated in FIGS. 9–9B, upon invocation the smart hibernation process locks a number of pages of extended memory 1210 in volatile memory 402, forming both hibernation module pages 426 and bootstrap pages 512. Assuming that these pages are locked, in an MS-DOS® system, the smart hibernation process switches to protected mode. Subsequently as previously described, the smart hibernation process determines the total number of pages in volatile memory 402.

Prior to disabling interrupts and other processors, the smart hibernation process reserves the requisite number of pages within extended memory 1210, forming reserved PTE table 508. The requisite number of pages for PTEs for reserved memory in an MS-DOS® system (i.e., "requisite reserved") is determined based on the following formula:

$$\text{requisite reserved} = 640 \text{ kbytes}/4 \text{ kbytes (for MS-DOS}^{\circledR} \text{ memory)} + \quad \text{(Equation 6)}$$
$$64 \text{ kbytes}/4 \text{ kbytes (for HIMEM memory)} -$$
$$1 \text{ (no need to reserve pages for bootstrap pages)}$$
$$= 175 \text{ pages}$$

The smart hibernation process also copies a PTE for each page in reserved memory 502 into reserved PTE table 508. The requisite number of free pages are reserved within extended memory 1210 to form copied reserved pages 506 to be used subsequently to copy portions of reserved memory 502 therein.

After disabling the interrupts and other processors, the smart hibernation process determines the number of hibernated pages in extended memory 1210. As previously described, the smart hibernation process then determines the number of pages to be subsequently saved to hibernated file 414. If the difference between one-half of the total number of pages and the total number of locked pages of extended memory 1210 is less than or equal to 512 Kbytes, the operating system aborts the smart hibernation process and returns an error. Conversely, if the difference is greater than 512 Kbytes, the smart hibernation process continues into the reduction and checking process.

In particular, if the number of pages trying to be committed (i.e., reserved) equal zero, the operating system aborts the smart hibernation process and returns an error. Conversely, if those number of pages do not equal zero, the smart hibernation process attempts to reserve enough non-locked pages in extended memory 1210 to form copied hibernated pages 420 to hold a duplicate image of hibernated pages 406. If this reservation is unsuccessful, the reduction and checking process, as previously described, reduces the number of idle pages in extended memory 1210 until (1) the number of non-locked pages are free to make the duplicate image or (2) the number of pages trying to be committed equal zero.

Assuming that the reservation was successful, prior to actual creation of the duplicate image, the smart hibernation process duplicates the pages within both MS-DOS® memory 1204 (exclusive of bootstrap pages 512) and HIMEM memory 1208 into copied reserved pages 506 within extended memory 1210. Subsequently, the smart hibernation process copies the hibernated pages into copied hibernated pages 420 and the PTEs into PTE table 404 within extended memory 1210. The smart hibernation process reenables the interrupts and other processors and fills in the hibernated header pages 428. Finally, the smart hibernation process saves the hibernated header pages 428, the PTE table 404 and the hibernated pages 406 into hibernated file 414 in secondary storage 410.

Subsequent to powering on computer 418 and restoring of the hibernated pages within extended memory 1210, the smart hibernation process places the copy module into bootstrap pages 512. The copy module is then executed to switch to protected mode and to restore all the pages within MS-DOS® memory 1204 and HIMEM memory 1208 from the copies in the locked pages within extended memory 1210, thereby completing the restoration of volatile memory 402.

In an alternative embodiment illustrated in FIGS. 11A–11B and used in conjunction with the embodiment of volatile memory 402 used by the MS-DOS® system illustrated in FIG. 12 described above, upon invocation the smart hibernation process locks a number of pages of extended memory 1210 in volatile memory 402, forming both hibernation module pages 426 and bootstrap pages 512. If these pages are successfully locked, in an MS-DOS® system, the smart hibernation process switches to protected mode.

Prior to disabling all the non-paging device drivers, the smart hibernation process reserves the requisite number of pages within extended memory 1210, forming reserved PTE table 508, which has been previously described in conjunction with equation 6, is 175 pages. Additionally, the smart hibernation process copies a PTE for each page in reserved memory 502 into reserved PTE table 508. The requisite number of free pages are reserved within extended memory 1210 to form copied reserved pages 506 to be used subsequently to copy portions of reserved memory 502 therein. After disabling the non-paging device drivers, the smart hibernation process determines the lesser of (1) one-half of all the pages in extended memory 1210 plus the number of pages to save a header section and the PTEs for one-half of the pages in extended memory 1210 versus (2) all of the pages in extended memory 1210 that are locked or idle plus the number of pages to the PTEs for these pages along with a header section. Moreover, the smart hibernation process attempts to reserve a number of pages in extended memory 1210 equaling the lesser of these two values.

If the reservation is successful, the smart hibernation process deactivates the paging device driver. Prior to the actual creation of the duplicate image within extended memory 1210, the smart hibernation process duplicates the pages within both MS-DOS® memory 1204 (exclusive of bootstrap pages 512) and HIMEM memory 1208 into copied reserved pages 506 within extended memory 1210. Subsequently, the smart hibernation process copies the hibernated pages into copied hibernated pages 420 and the PTEs into PTE table 404 within extended memory 1210. Subsequently, the smart hibernation process writes these pages to hibernated file 414 by reactivating the paging device driver and instructing this driver to perform this write operation.

Subsequent to powering on computer 418 and restoring of the hibernated pages within extended memory 1210, the smart hibernation process places the copy module into bootstrap pages 512. The copy module is then executed to switch to protected mode and to restore all the pages within MS-DOS® memory 1204 and HIMEM memory 1208 from the copies in the locked pages within extended memory 1210, thereby completing the restoration of volatile memory 402.

The above-described modifications to the smart hibernation process to account for computers having a volatile memory with reserved sections has been described in terms of a WINDOWS® 98/ MS-DOS® system. However, as those of ordinary skill within the art will appreciate, the invention is not so limited as this modification to the smart hibernation process can be used on a computer having any type of volatile memory with reserved sections therein.

Conclusion

The smart hibernation process for an operating system with page translation has been described. The smart hibernation creates a duplicate memory image of the pages that need to be saved (i.e. hibernated) within volatile memory. The pages to be hibernated include all pages whose state is locked and a portion, if not all, of the pages whose state is idle. This duplicate memory image of the pages to be hibernated along with a corresponding page table identifying their location within volatile memory are then written out to a file on the secondary storage.

This hibernation process balances between saving of information directly from the volatile memory versus saving of information from the swap file located on a secondary storage of the computer system. Additionally, this hibernation process allows the use of regular disk services available during the normal operating environment. Although specific embodiments have been illustrated and described herein, it will be appreciated by those of ordinary skill in the art that any arrangement that is calculated to achieve the same purpose may be substituted for the specific embodiments shown. For example, those of ordinary skill in the art will appreciate that the smart hibernation process is applicable to any operating system with page translation. Furthermore, those of ordinary skill in the art will appreciate that the invention covers both a computer system having, as well as a computer system not having, portions of its volatile memory reserved. Moreover, those of ordinary skill in the art will appreciate that the embodiments covering a computer system having portions of its volatile memory reserved are not limited to the specific embodiments of volatile memory described herein.

This application is intended to cover any adaptations or variations of the present invention. Therefore, it is manifestly intended that this invention be limited only by the following claims and equivalents thereof.

We claim:

1. A computerized method for hibernation comprising:
    marking pages in a volatile memory of a computer system as hibernated pages;
    increasing a number of free pages in the volatile memory of the computer system;
    duplicating the hibernated pages in the volatile memory of the computer system; and
    saving the duplicated hibernated pages in the volatile memory to a secondary storage of the computer system.

2. The computerized method of claim 1, wherein increasing the number of free pages comprises reducing the hibernated pages in the volatile memory of the computer system.

3. The computerized method of claim 2, wherein reducing the hibernated pages in the volatile memory of the computer system comprises moving a portion of the hibernated pages categorized as idle out to a swap file on the secondary storage.

4. The computerized method of claim 2, further comprising locking the number of free pages in the volatile memory.

5. The computerized method of claim 1, wherein duplicating the hibernated pages in the volatile memory comprises duplicating locked pages and idle pages.

6. The computerized method of claim 1, wherein saving the duplicated hibernated pages in the volatile memory to the secondary storage of the computer system comprises writing the duplicated hibernated pages to a file in the secondary storage of the computer system using regular disk services.

7. The computerized method of claim 6, wherein writing the duplicated hibernated pages comprises writing to a number of noncontiguous locations on the secondary storage.

8. The computerized method of claim 1, further comprising saving a page table having an original position for each of the hibernated pages within the volatile memory to the secondary storage of the computer system.

9. The computerized method of claim 8, wherein saving the page table comprises reserving pages in the volatile memory for a number of page table entries for the volatile memory.

10. The computerized method of claim 8, further comprising shutting off power to the computer system.

11. The computerized method of claim 8, further comprising copying the duplicated hibernated pages from the secondary storage to the original position for each of the hibernated pages within the volatile memory of the computer system upon restoration of power to the computer system.

12. A computerized method for hibernation comprising:
    marking pages in a volatile memory of a computer system as hibernated pages;
    recursively performing a locking process until a number of free pages that the locking process is attempting to lock, are locked in the volatile memory or no free pages can be locked in the volatile memory;
    duplicating the hibernated pages in the volatile memory of the computer system; and
    saving the duplicated hibernated pages in the volatile memory to a secondary storage of the computer system.

13. The computerized method of claim 12, wherein the locking process comprises:
    attempting to lock the number of free pages in the volatile memory; and
    increasing a number of free pages in the volatile memory.

14. The computerized method of claim 13, wherein increasing the number of free pages comprises reducing the hibernated pages in the volatile memory by a predetermined portion.

15. The computerized method of claim 14, wherein the predetermined portion is approximately one-half.

16. The computerized method of claim 14, wherein reducing the hibernated pages in the volatile memory of the computer system comprises moving a portion of the hibernated pages categorized as idle out to a swap file on the secondary storage.

17. A computerized method for hibernation comprising:
    marking pages in a volatile memory of a computer system as hibernated pages;
    locking a portion of free pages in the volatile memory;
    duplicating the hibernated pages in the volatile memory of the computer system; and
    saving the duplicated hibernated pages in the volatile memory to a secondary storage of the computer system.

18. The computerized method of claim 17, wherein the portion of free pages includes a minimum value equaling a lesser of approximately one-half of the pages in the volatile memory and of approximately a total number of the hibernated pages.

19. The computerized method of claim 17, further comprising increasing a number of free pages in the volatile memory.

20. The computerized method of claim 19, wherein increasing the number of free pages in the volatile memory includes reducing a portion of the hibernated pages in the volatile memory.

21. The computerized method of claim 20, wherein reducing the portion of the hibernated pages in the volatile memory includes moving a portion of the hibernated pages categorized as idle out to a swap file on the secondary storage.

22. The computerized method of claim 21, wherein saving the duplicated hibernated pages in the volatile memory to the secondary storage of the computer system includes turning on a flag, such that the flag indicates to a paging device driver of the computer system to write the duplicated hibernated pages to a file in the secondary storage of the computer system when the paging device driver is reactivated.

23. A computerized method comprising:
    marking pages in a non-reserved section of a volatile memory of a computer system as hibernated pages;
    copying a reserved section of the volatile memory of the computer system into a portion of the non-reserved section of the volatile memory, wherein the portion comprises hibernated pages;
    duplicating the hibernated pages in the non-reserved section of the volatile memory; and
    saving the duplicated hibernated pages in the non-reserved section of the volatile memory to a secondary storage of the computer system.

24. The computerized method of claim 23, further comprising increasing a number of free pages in the non-reserved section of the volatile memory.

25. The computerized method of claim 24, wherein increasing the number of free pages comprises reducing the hibernated pages in the non-reserved section of the volatile memory.

26. The computerized method of claim 25, wherein reducing the hibernated pages in the volatile memory of the computer system comprises moving a portion of the hibernated pages categorized as idle out to a swap file on the secondary storage.

27. The computerized method of claim 23, further comprising locking the number of free pages in the non-reserved section of the volatile memory.

28. The computerized method of claim 23, further comprising recursively performing a locking process until a number of free pages, that the locking process is attempting to lock, are locked in the non-reserved section of the volatile memory or no free pages can be locked in the non-reserved section of the volatile memory.

29. The computerized method of claim 28, wherein the locking process comprises:
   attempting to lock the number of free pages in the non-reserved section of the volatile memory; and
   increasing a number of free pages in the non-reserved section of the volatile memory.

30. The computerized method of claim 29, wherein increasing the number of free pages comprises reducing the hibernated pages in the non-reserved section of the volatile memory by a predetermined portion.

31. The computerized method of claim 30, wherein the predetermined portion is approximately one-half.

32. The computerized method of claim 30, wherein reducing the hibernated pages comprises moving a portion of the hibernated pages categorized as idle out to a swap file on the secondary storage.

33. The computerized method of claim 23, further comprising locking a portion of free pages in the volatile memory.

34. The computerized method of claim 33, wherein the portion of free pages includes a minimum value equaling a lesser of approximately one-half of the pages in the volatile memory and of approximately a total number of the hibernated pages.

35. The computerized method of claim 33, further comprising increasing a number of free pages in the volatile memory.

36. The computerized method of claim 35, wherein increasing the number of free pages in the volatile memory includes reducing a portion of the hibernated pages in the volatile memory.

37. The computerized method of claim 36, wherein reducing the portion of the hibernated pages in the volatile memory includes moving a portion of the hibernated pages categorized as idle out to a swap file on the secondary storage.

38. The computerized method of claim 37, wherein saving the duplicated hibernated pages in the volatile memory to the secondary storage of the computer system includes turning on a flag, such that the flag indicates to a paging device driver of the computer system to write the duplicated hibernated pages to a file in the secondary storage of the computer system when the paging device driver is reactivated.

39. The computerized method of claim 23, wherein duplicating the hibernated pages in the volatile memory comprises duplicating locked pages and idle pages.

40. The computerized method of claim 23, wherein saving the hibernated pages in the volatile memory comprises writing the hibernated pages to a file on the secondary storage of the computer system using regular disk services.

41. The computerized method of claim 40, wherein writing the hibernated pages comprises writing to a number of noncontiguous locations on the secondary storage.

42. The computerized method of claim 23, further comprising reserving a bootstrap page in the reserved section of the volatile memory.

43. The computerized method of claim 42, further comprising saving a page table having an original position for each of the hibernated pages within the volatile memory to the secondary storage of the computer system.

44. The computerized method of claim 43, further comprising shutting off power to the computer system.

45. The computerized method of claim 44, further comprising copying the duplicated hibernated pages from the secondary storage to the original position for each of the hibernated pages within the non-reserved section of the volatile memory of the computer system.

46. The computerized method of claim 45, further comprising:
   moving a copy module from hibernated pages in the non-reserved section to the bootstrap page in the reserved section; and
   executing the copy module, wherein the copy module copies the portion of the non-reserved section of the volatile memory back to the reserved section of the volatile memory.

47. A computer readable medium having computer-executable instructions comprising:
   copying a reserved section of a volatile memory of a computer system into a portion of a non-reserved section of the volatile memory, wherein the portion contains hibernated pages;
   duplicating the hibernated pages in the non-reserved section of the volatile memory; and
   saving the duplicated hibernated pages in the non-reserved section of the volatile memory to a secondary storage of the computer system.

48. A computer readable medium having stored thereon executable code for providing a header data structure used to save duplicated hibernated pages from a volatile memory of a computer system to a file on a secondary storage of a computer system, comprising:
   a first data field containing data representing a total number of duplicated hibernated pages within the volatile memory to be saved to the file on the secondary storage of the computer system; and
   a second data field containing data representing a flag, wherein the flag indicates whether a restoration from the file on the secondary storage of the computer system to the volatile memory of the computer system is completed for the duplicated hibernated pages being counted for the total number for the first data field.

49. The computer readable medium of claim 48, further comprising a third data field containing data representing a copy module, wherein the copy module has computer-executable code for copying from a non-reserved section of the volatile memory of the computer system to a reserved section of the volatile memory a number of the duplicated hibernated pages being counted for the total number for the first data field.

50. A computerized system for hibernation comprising:
   a volatile memory holding hibernated pages;
   a computer-readable medium operatively coupled to the volatile memory;

a secondary storage operatively coupled to the volatile memory and the computer-readable medium through a system bus;

a processing unit operatively coupled to the volatile memory and the computer-readable medium through the system bus; and a smart hibernation process executing on the processing unit from the computer-readable medium, wherein the smart hibernation process causes the processing unit to mark pages in the volatile memory as hibernated pages, increase a number of free pages in the volatile memory, duplicate the hibernated pages within the volatile memory and save the duplicated hibernated pages to the secondary storage from the volatile memory.

51. The computerized system of claim 50, wherein the smart hibernation process causes the processing unit to increase the number of free pages in the volatile memory by reducing the hibernated pages within the volatile memory.

52. The computerized system of claim 50, wherein the smart hibernation process causes the processing unit to lock the number of free pages in the volatile memory.

53. The computerized system of claim 50, wherein the smart hibernation process causes the processing unit to lock a portion of free pages in the volatile memory.

54. The computerized system of claim 50, wherein the smart hibernation process causes the processing unit to increase the number of free pages in the volatile memory by reducing a portion of the hibernated pages in the volatile memory.

55. The computerized system of claim 54, wherein the smart hibernation process causes the processing unit to reduce the portion of the hibernated pages in the volatile memory by moving the portion of the hibernated pages categorized as idle out to a swap file on the secondary storage.

56. The computerized system of claim 55, wherein the smart hibernation process causes the processing unit to save the duplicated hibernated pages in the volatile memory to the secondary storage of the computer system by turning on a flag, such that the flag indicates to a paging device driver of the computer system to write the duplicated hibernated pages to a file in the secondary storage of the computer system when the paging device driver is reactivated.

57. The computerized system of claim 50, wherein the smart hibernation process causes the processing unit to save the duplicated hibernated pages in the volatile memory by writing the duplicated hibernated pages to a file on the secondary storage using regular disk services.

58. The computerized system of claim 57, wherein the smart hibernation process causes the processing unit to write the duplicated hibernated pages to the file on the secondary storage using regular disk services by writing to a number of noncontiguous locations on the secondary storage.

59. A computerized system for hibernation comprising:

a volatile memory holding hibernated pages;

a computer-readable medium operatively coupled to the volatile memory;

a secondary storage operatively coupled to the volatile memory and the computer-readable medium through a system bus;

a processing unit operatively coupled to the volatile memory and the computer-readable medium through the system bus; and a smart hibernation process executing on the processing unit from the computer-readable medium, wherein the smart hibernation process causes the processing unit to mark pages in the volatile memory as hibernated pages, recursively perform a locking process until a number of free pages that the locking process is attempting to lock, are locked in the volatile memory or no free pages can be locked in the volatile memory, duplicate the hibernated pages within the volatile memory and save the duplicated hibernated pages to the secondary storage from the volatile memory.

60. The computerized system of claim 59, wherein the locking process comprises:

attempting to lock the number of free pages in the volatile memory; and increasing a number of free pages in the volatile memory.

61. The computerized system of claim 60, wherein the smart hibernation process causes the processing unit to increase the number of free pages in the volatile memory by reducing the hibernated pages in the volatile memory by a predetermined portion.

62. The computerized system of claim 61, wherein the predetermined portion is approximately one-half.

63. The computerized system of claim 61, wherein the smart hibernation process causes the processing unit to reduce the hibernated pages by moving a portion of the hibernated pages categorized as idle out to a swap file on the secondary storage.

64. A computerized system for hibernation comprising:

a volatile memory holding hibernated pages;

a computer-readable medium operatively coupled to the volatile memory;

a secondary storage operatively coupled to the volatile memory and the computer-readable medium through a system bus;

a processing unit operatively coupled to the volatile memory and the computer-readable medium through the system bus; and a smart hibernation process executing on the processing unit from the computer-readable medium, wherein the smart hibernation process causes the processing unit to mark pages in the volatile memory as hibernated pages, lock a portion of free pages in the volatile memory wherein the portion of free pages includes a minimum value equaling a lesser of approximately one-half of the pages in the volatile memory and of approximately a total number of the hibernated pages, duplicate the hibernated pages within the volatile memory and save the duplicated hibernated pages to the secondary storage from the volatile memory.

65. A computer readable medium having computer-executable instructions for preserving, through a smart hibernation process, at least the computer system's processor and application state, including saving the hibernation execution files, the instructions comprising:

marking pages in a volatile memory of a computer system as hibernated pages;

increasing a number of free pages in the volatile memory of the computer system;

duplicating the hibernated pages in the volatile memory of the computer system; and saving the duplicated hibernated pages in the volatile memory to a secondary storage of the computer system.

66. The computer readable medium of claim 65, wherein increasing the number of free pages comprises reducing the hibernated pages in the volatile memory of the computer system.

67. The computer readable medium of claim 65, wherein reducing the hibernated pages in the volatile memory of the computer system comprises moving a portion of the hibernated pages categorized as idle out to a swap file on the second storage.

68. The computer readable medium of claim 67, further comprising instructions for locking the number of free pages in the volatile memory.

69. A computer readable medium having computer-executable instructions for preserving, through a smart hibernation process, at least the computer system's processor and application state, including saving the hibernation execution files, the instructions comprising:

marking pages in a volatile memory of a computer system as hibernated pages;

recursively performing a locking process until a number of free pages that the locking process is attempting to lock, are locked in the volatile memory or no free pages can be locked in the volatile memory;

duplicating the hibernated pages in the volatile memory of the computer system; and saving the duplicated hibernated pages in the volatile memory to a secondary storage of the computer system.

70. The computer readable medium of claim 69, wherein the locking process comprises:

attempting to lock the number of free pages in the volatile memory; and increasing a number of free pages in the volatile memory.

71. The computer readable medium of claim 70, wherein increasing the number of free pages comprises reducing the hibernated pages in the volatile memory by a predetermined portion.

72. The computer readable medium of claim 71, wherein the predetermined portion is approximately one-half.

73. The computer readable medium of claim 71, wherein reducing the hibernated pages in the volatile memory of the computer system comprises moving a portion of the hibernated pages categorized as idle out to a swap file on the secondary storage.

74. A computer readable medium having computer-executable instructions for preserving, through a smart hibernation process, at least the computer system's processor and application state, including saving the hibernation execution files, the instructions comprising:

marking pages in a volatile memory of a computer system as hibernated pages;

locking a portion of free pages in the volatile memory;

duplicating the hibernated pages in the volatile memory of the computer system; and saving the duplicated hibernated pages in the volatile memory to a secondary storage of the computer system.

75. The computer readable medium of claim 74, wherein the portion of free pages includes a minimum value equaling a lesser of approximately one-half of the pages in the volatile memory and of approximately a total number of the hibernated pages.

76. The computer readable medium of claim 71, further comprising instructions for increasing a number of free pages in the volatile memory.

77. The computer readable medium of claim 76, wherein increasing the number of free pages in the volatile memory includes reducing a portion of the hibernated pages in the volatile memory.

78. The computer readable medium of claim 77, wherein reducing the portion of the hibernated pages in the volatile memory includes moving a portion of the hibernated pages categorized as idle out to a swap file on the secondary storage.

79. The computer readable medium of claim 78, wherein saving the duplicated hibernated pages in the volatile memory to the secondary storage of the computer system includes turning on a flag, such that the flag indicated to a paging device driver of the computer system to write the duplicated hibernated pages to a file in the secondary storage of the computer system when the paging device driver is reactivated.

* * * * *

UNITED STATES PATENT AND TRADEMARK OFFICE
CERTIFICATE OF CORRECTION

PATENT NO.     : 6,609,182 B1
DATED          : August 19, 2003
INVENTOR(S)    : Raymond D. Pedrizetti and Pierre-Yves Santerre It is certified that error appears in the above-identified patent and that said Letters Patent is hereby corrected as shown below:

Column 3,
Line 43, after "invention" please delete "provide" and insert -- provides --

Column 4,
Line 14, after "of the invention" please delete "." and insert -- ; --
Line 19, after "having a volatile" please delete "."

Column 5,
Line 4, after "including a memory bus" please delete "or memory bus"

Column 10,
Line 18, after "the saving" please insert -- of --
Line 31, before "currently been" please delete "has" and insert -- have --

Column 14,
Line 17, after "file 414 to" please delete "stayed" and insert -- stay --

Column 16,
Line 32, before "to hibernated" please delete "page" and insert -- pages --

Column 17,
Line 37, after "FIGS. 6B and 6E" please delete "are" and insert -- is --

Column 18,
Line 35, after "If" please delete "that"

Column 19,
Line 54, after "pages of" please delete "in"

UNITED STATES PATENT AND TRADEMARK OFFICE
CERTIFICATE OF CORRECTION

PATENT NO. : 6,609,182 B1
DATED : August 19, 2003
INVENTOR(S) : Raymond D. Pedrizetti and Pierre-Yves Santerre It is certified that error appears in the above-identified patent and that said Letters Patent is hereby corrected as shown below:

Column 23,
Line 35, after "and restoring" please delete "of"

Column 28,
Line 54, after "is" please delete "completed" and insert -- complete --

Signed and Sealed this

Twenty-third Day of March, 2004

JON W. DUDAS
*Acting Director of the United States Patent and Trademark Office*